(12) United States Patent
Chisu et al.

(10) Patent No.: US 11,470,675 B2
(45) Date of Patent: Oct. 11, 2022

(54) CALL TYPE SELECTION BASED ON FAILURE PROBABILITY

(71) Applicant: Motorola Mobility LLC, Chicago, IL (US)

(72) Inventors: Daniel C. Chisu, Franklin Park, IL (US); Si Chen, Chicago, IL (US)

(73) Assignee: Motorola Mobility LLC, Chicago, IL (US)

( * ) Notice: Subject to any disclaimer, the term of this patent is extended or adjusted under 35 U.S.C. 154(b) by 0 days.

(21) Appl. No.: 17/191,246

(22) Filed: Mar. 3, 2021

(65) Prior Publication Data
US 2022/0287129 A1 Sep. 8, 2022

(51) Int. Cl.
*H04W 76/19* (2018.01)
*H04W 4/029* (2018.01)

(52) U.S. Cl.
CPC ........... *H04W 76/19* (2018.02); *H04W 4/029* (2018.02)

(58) Field of Classification Search
CPC ............. H04W 36/00; H04W 36/0083; H04W 36/0097; H04W 36/08; H04W 36/36; H04W 36/30; H04W 36/38; H04W 36/16; H04W 36/24; H04W 76/19; H04W 4/29
USPC .................................................. 455/436–444
See application file for complete search history.

(56) References Cited

U.S. PATENT DOCUMENTS

| 7,903,806 | B1 | 3/2011 | Pester, III |
| 9,077,785 | B2 | 7/2015 | Shuman et al. |
| 9,674,761 | B2 | 6/2017 | Balasubramanian et al. |
| 9,930,578 | B2 | 3/2018 | Vashi et al. |
| 10,757,602 | B2 | 8/2020 | Zhang et al. |
| 2006/0183472 | A1 | 8/2006 | Nookala et al. |
| 2006/0209798 | A1 | 9/2006 | Oikarinen et al. |
| 2007/0127652 | A1 | 6/2007 | Divine et al. |
| 2008/0118042 | A1 | 5/2008 | Hogg |
| 2008/0160989 | A1* | 7/2008 | Favre .................... H04W 36/36 455/424 |
| 2008/0205413 | A1 | 8/2008 | Purnadi et al. |
| 2008/0261600 | A1* | 10/2008 | Somasundaram .......................... H04W 36/0079 455/436 |
| 2010/0040020 | A1 | 2/2010 | Chen |
| 2010/0173633 | A1* | 7/2010 | Catovic ................. H04W 24/02 455/436 |
| 2010/0234029 | A1 | 9/2010 | Ishii et al. |

(Continued)

OTHER PUBLICATIONS

"IMS Service Centralization and Continuity Guidelines", GSM Association, Version 13.0 [retrieved Apr. 7, 2021]. Retrieved from the Internet <https://www.gsma.com/newsroom/wp-content/uploads/IR.64-v13.0.pdf>., Feb. 2, 2016, 23 pages.

(Continued)

*Primary Examiner* — Joshua L Schwartz
(74) *Attorney, Agent, or Firm* — FIG. 1 Patents

(57) ABSTRACT

Techniques for call type selection based on failure probability are described and may be implemented via a wireless device to adapt to a variety of different wireless scenarios. Generally, the described techniques provide a wireless device with the ability to implement a wireless call event via different call types, e.g., different radio access technologies (RATs). For instance, when a first call type frequently experiences failure at a particular location, a second call type is utilized to initiate calls at the location, such as based on call records for historic call events.

20 Claims, 19 Drawing Sheets

(56) References Cited

U.S. PATENT DOCUMENTS

| | | |
|---|---|---|
| 2010/0272025 A1 | 10/2010 | Yu |
| 2011/0002272 A1 | 1/2011 | Motohashi et al. |
| 2011/0110302 A1 | 5/2011 | Faurie et al. |
| 2011/0188451 A1 | 8/2011 | Song et al. |
| 2011/0242975 A1 | 10/2011 | Zhao et al. |
| 2011/0250925 A1* | 10/2011 | Han .................. H04W 36/0058 455/524 |
| 2012/0009939 A1 | 1/2012 | Islam et al. |
| 2013/0021933 A1 | 1/2013 | Kovvali et al. |
| 2013/0094446 A1 | 4/2013 | Swaminathan |
| 2013/0279442 A1 | 10/2013 | Tiwari |
| 2013/0329567 A1 | 12/2013 | Mathias et al. |
| 2014/0242996 A1 | 8/2014 | Nakamura et al. |
| 2014/0269615 A1 | 9/2014 | Greenwalt, III |
| 2015/0023277 A1 | 1/2015 | Kim et al. |
| 2015/0117406 A1 | 4/2015 | Kim et al. |
| 2015/0350965 A1 | 12/2015 | Kabadi et al. |
| 2016/0044545 A1 | 2/2016 | Yang et al. |
| 2016/0100336 A1 | 4/2016 | Basavarajappa et al. |
| 2016/0330655 A1 | 11/2016 | Vashi et al. |
| 2016/0366619 A1 | 12/2016 | Yang et al. |
| 2017/0111514 A1 | 4/2017 | Chandrasekaran et al. |
| 2017/0303181 A1 | 10/2017 | Gupta et al. |
| 2020/0045168 A1 | 2/2020 | Sinha |
| 2020/0296788 A1 | 9/2020 | Wirtanen et al. |
| 2020/0413317 A1 | 12/2020 | Gao et al. |
| 2021/0037430 A1 | 2/2021 | Jin et al. |

OTHER PUBLICATIONS

Keller, Ralf , "Voice in 5G system—architecture and EPS fallback", Ericsson Blog, Ericsson Group [retrieved Apr. 7, 2021]. Retrieved from the Internet <https://www.ericsson.com/en/blog/2018/9/voice-in-5g-systemarchitecture-and-eps-fallback>., Sep. 24, 2018, 4 pages.

Pedrini, Leonardo Z. , "What is CSFB and SRVCC in LTE?", telecomHall Forum Blog [retrieved Apr. 7, 2021]. Retrieved from the Internet <https://www.telecomhall.net/t/what-is-csfb-and-srvcc-in-lte/6279>., Oct. 23, 2019, 21 pages.

"Fixed Line Backup", Robustel [online][retrieved May 11, 2021]. Retrieved from the Website <https://www.robustel.com/retail/fixed-line-backup/>., 5 pages.

"Multiple description coding", Wikipedia, The Free Encyclopedia [retrieved May 11, 2021]. Retrieved from the Internet <https://en.wikipedia.org/wiki/Multiple_description_coding>., 2 pages.

Al-Mualla, Mohammed Ebrahim, et al., "Chapter 10—Error Concealment Using Motion Field Interpolation", In Signal Processing and its Applications, Video Coding for Mobile Communications, Academic Press [retrieved May 11, 2021]. Retrieved from the Internet <http://160592857366.free.fr/joe/ebooks/Electronics, 2002, pp. 231-257.

Baharudin, Muhammad Ariff Bin, et al., "Improvement of Handover Performance Based on Bio-Inspired Approach with Received Signal Strength and Mean Opinion Score", Arab J Sci Eng, vol. 40 [retrieved May 11, 2021]. Retrieved from the Internet <https://doi.org/10.1007/s13369-015-1638-5>., Apr. 4, 2015, 14 pages.

Chisu, Daniel C, et al., "U.S. Application as Filed", U.S. Appl. No. 17/191,246, filed Mar. 3, 2021, 79 pages.

Jadhav, Sheetal , et al., "MOS-based Handover Protocol for Next Generation Wireless Networks", AINA '12: Proceedings of the 2012 IEEE 26th International Conference on Advanced Information Networking and Applications [retrieved May 11, 2021]. Retrieved from the Internet <http://www.cs.otago.ac.nz/staffpriv/hzy/papers/aina2012.pdf>., Mar. 2012, 8 pages.

Jaganathan, Suresh , et al., "High Quality of Service on Video Streaming in P2P Networks using FST-MDC", International Journal of Multimedia & Its Applications (IJMA), vol. 3, No. 2 [retrieved May 11, 2011]. Retrieved from the Internet <https://arxiv.org/ftp/arxiv/papers/1105/1105.5641.pdf>., May 2011, 11 pages.

Krishna K, Bala Murali, et al., "A Dynamic Link Aggregation Scheme for Heterogeneous Wireless Networks", 2014 IEEE International Conference on Electronics, Computing and Communication Technologies (CONECCT) [retrieved May 11, 2021]. Retrieved from the Internet <https://newslab.iith.ac.in/networks/downloads/adynamic.pdf>., Jan. 2014, 6 pages.

Sauter, Martin , "VoLTE and VoWifi—Wireless Telephony Has Truly Become Network Independent", WirelessMoves Blog [retrieved May 11, 2021]. Retrieved from the Internet <https://blog.wirelessmoves.com/2016/08/volte-and-vowifi-wireless-telephony-has-truly-become-network-independent.html>., May 1, 2016, 2 pages.

U.S. Appl. No. 17/191,316, "Non-Final Office Action", U.S. Appl. No. 17/191,316, dated May 18, 2022, 12 pages.

U.S. Appl. No. 17/191,316, "Notice of Allowance", U.S. Appl. No. 17/191,316, dated Aug. 11, 2022, 7 pages.

\* cited by examiner

| Call ID | Date | Start Time | Location | Device ID | Carrier | Initial RAT | Failure Event | Action | Status | Final RAT | Duration |
|---|---|---|---|---|---|---|---|---|---|---|---|
| 9a8f45h87 | 01.27.21 | 13:55:22 | 47.65583, -117.4143 | Xjyn-4456 | ABC Co. | 4G | Drop | Fallback | OK | 3G | 8:15:12 |
| 3de98f4z4 | 01.12.21 | 08:55:01 | 47.65471, -117.431 | Xjyn-4456 | ABC Co. | 5G | Low MOS | Fallback | OK | 4G | 4:22:02 |
| 6km44ksi5 | 11.15.20 | 11:15:07 | 47.65583, -117.4143 | Xjyn-4456 | ABC Co. | 4G | Drop | Fallback | OK | 3G | 7:01:31 |

Fig. 4

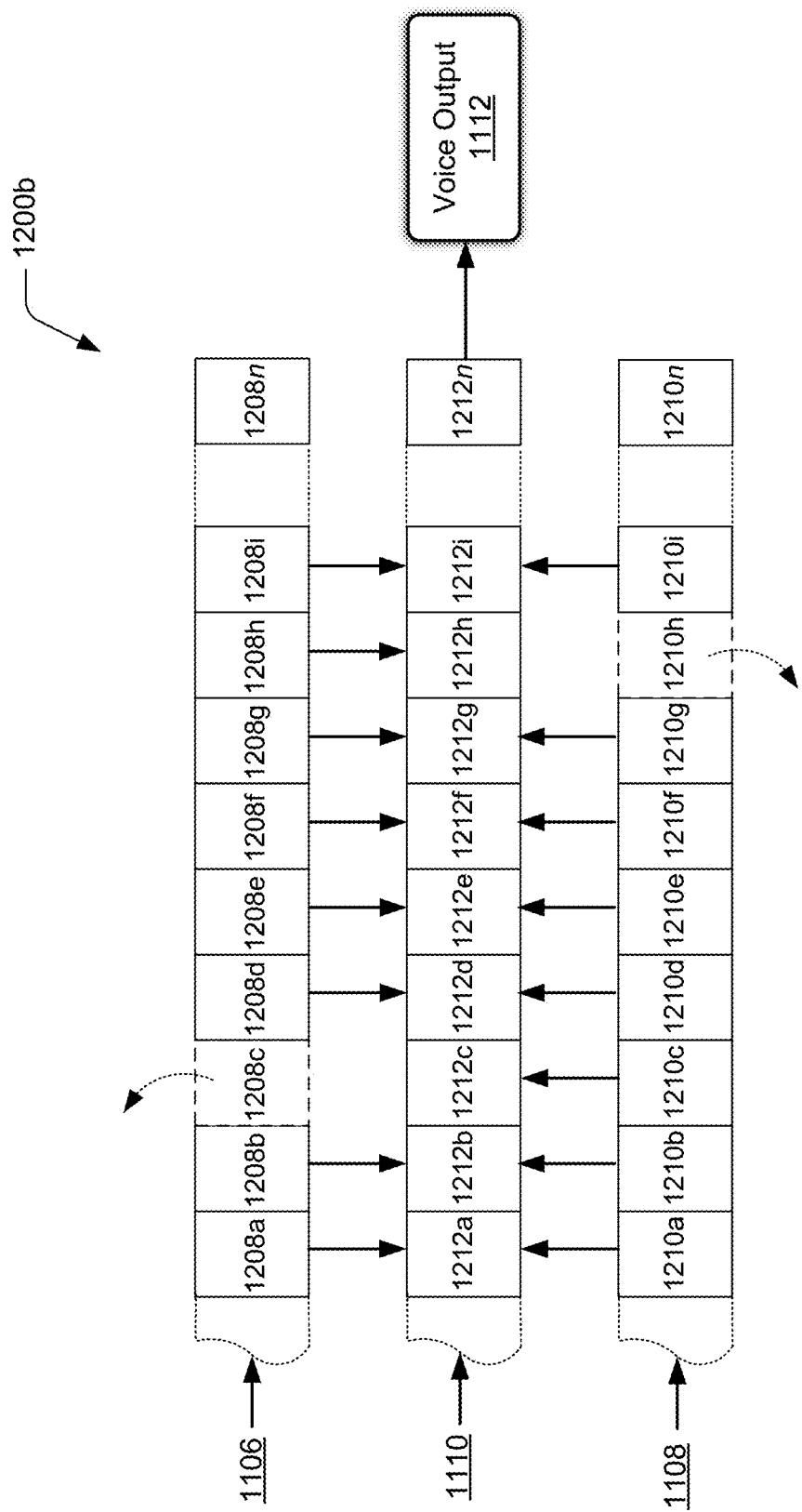

CALL TYPE SELECTION BASED ON FAILURE PROBABILITY

BACKGROUND

Wireless communication is ubiquitous and is used for a multitude of purposes, including wireless voice and data communication. Further, wireless protocols are constantly evolving to provide increased service levels for wireless users. Accordingly, a variety of different radio access technologies (RAT) are available for implementing wireless communication, including 3G, 4G Long Term Evolution (LTE), 5G (e.g., 5G New Radio (NR)), WiFi, and so forth. A single wireless device (e.g., a mobile phone) typically supports multiple different RATs and thus can switch between them in response to different conditions. For instance, circuit switched fallback (CSFB) techniques are sometime utilized by wireless carriers to provide a circuit switched connection when a packet switched network is not available and/or a packet switched call fails. Conventional implementations for CSFB, however, often generate user detectable interruption into voice calls, such as part of the connectivity process for connecting to the fallback network.

BRIEF DESCRIPTION OF THE DRAWINGS

Aspects of call type selection based on failure probability and multiple call types for a call event are described with reference to the following Figures. The same numbers may be used throughout to reference similar features and components that are shown in the Figures:

FIG. 4 depicts call records that include data entries for different call events;

FIG. 12*b* depicts a scenario for combining media streams from packet switched media stream and a circuit switched media stream in accordance with one or more implementations;

DETAILED DESCRIPTION

Figure 1:
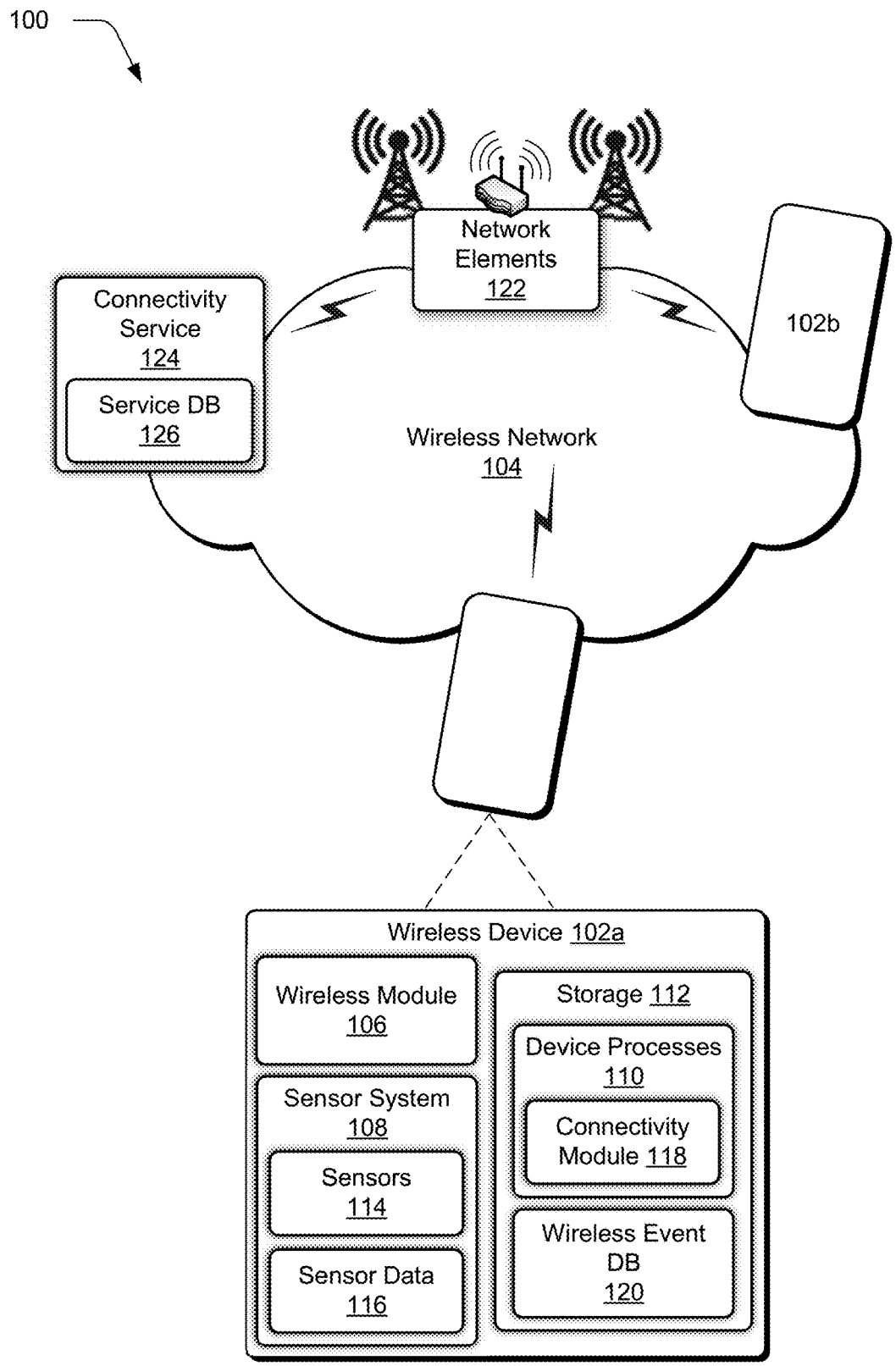
FIG. 1 illustrates an example environment in which aspects of call type selection based on failure probability can be implemented.

Techniques for call type selection based on failure probability are described and may be implemented via a wireless device to adapt to a variety of different wireless scenarios. Generally, the described techniques provide a wireless device with the ability to implement a wireless call event via different call types, e.g., different radio access technologies (RATs). For instance, consider a scenario where a wireless device (e.g., a wireless cellular phone) attempts to connect a wireless call at a particular physical location via a first call type, e.g., a default call type for the location. A failure event then occurs as part of the wireless call via the first call type, such as during call initiation and/or during an established call. A remedial process is then performed to successfully connect the wireless call using a second call type, e.g., a fallback call type. One example of such a remedial process is a circuit switched fallback (CSFB) from a packet-switched call type (e.g., the first call type) to a circuit switched call type, e.g., the second call type.

Accordingly, based on the failure event and the remedial process, a location record is generated that identifies at least the physical location at which the failure event occurred, the first call type, the second call type, as well as a probability that a failure event will occur using the first call type at the physical location. For instance, the location record includes a probability score that indicates the probability of failure using the first call type, and the probability score is based on a number of failure events that occur using the first call type at the location. When the probability score reaches a threshold score, a wireless call that occurs at the location can be initiated using the second call type, e.g., instead of the first, default call type. For instance, since the first call type frequently fails at the location (hence the high probability score) and the second call type has been successfully used to restore failed calls at the location, wireless calls at the location can be initiated via the second call type even when the first call type is identified as a default call type for the location. Generally, this mitigates interruptions in user experience (e.g., interruptions in voice stream) that typically occur in conventional fallback and redial implementations for correcting call anomalies in wireless calls.

Techniques for multiple call types for a call event are also described and may be implemented via a wireless device to enable multiple connections for wireless calls. For instance, consider a scenario where a wireless device is connected for a wireless call with a different wireless device via a first connection for a first call type. During the wireless call (e.g., call initiation and/or during the call session) an anomaly event occurs, such as an interruption in the flow of call media between the wireless devices. Accordingly, a second connection is established for a second call type, and the first call type and the second call type are utilized together for the wireless call. For instance, call media flows between the wireless devices using the two different connections and the two different call types.

In at least one implementation, call media streams (e.g., voice streams, video streams, content streams, and/or combinations thereof) received at the wireless device via the different call types are combined into a combined media stream that is utilized to generate media output for the call, e.g., as an output voice stream and/or other media stream. Generally, this enables a more robust representation of call media to be obtained based on call media included in redundant media streams received over the different call types. Further, if a particular call type fails (e.g., a particular connection is lost), the other call type can be utilized to maintain the wireless call, e.g., until another redundant connection can be established.

While features and concepts discussed herein can be implemented in any number of different devices, systems, environments, and/or configurations, aspects of the described implementations are described in the context of the following example devices, systems, and methods.

FIG. 1 illustrates an example environment 100 in which aspects of call type selection based on failure probability can be implemented. The example environment 100 includes a wireless computing device ("wireless device") 102a that is connectable to a wireless network 104. In this particular example, the wireless device 102a represents a portable device that can be carried by a user, such as a smartphone, a tablet device, a laptop, a wearable computing device, (e.g., a smartwatch or a fitness tracker), and so forth. These examples are not to be construed as limiting, however, and the wireless device 102a can be implemented in a variety of different ways and form factors. Further example attributes of the wireless device 102a are discussed below with reference to the device 1800 of FIG. 18.

The wireless device 102 includes various functionality that enables the wireless device 102 to perform different aspects of call type selection based on failure probability discussed herein, including a wireless module 106, a sensor system 108, and device processes 110 stored on a storage 112 of the wireless device 102a. The wireless module 106 represents functionality (e.g., hardware and logic) that enables the wireless device 102 to communicate wirelessly, such as for wireless data and voice communication. The wireless module 106, for instance, includes functionality to support different wireless protocols, such as wireless cellular (e.g., 2G, 3G, 4G, 5G, etc.), wireless broadband, Wireless Local Area Network (WLAN) (e.g., Wi-Fi), Wi-Fi Direct, wireless short distance communication (e.g., Bluetooth™ (including Bluetooth™ Low Energy (BLE)), Near Field Communication (NFC)), and so forth. The wireless module 106 includes various components such as antennas, a transceiver, a modem, an analog-to-digital converter (ADC), a digital-to-analog converter (DAC), a mixer, and so forth.

The sensor system 108 is representative of functionality to detect various physical and/or logical phenomena in relation to the wireless device 102a, such as motion, light, image detection and recognition, time and date, position, location, touch detection, temperature, and so forth. To enable the sensor system 108 to detect such phenomena, the sensor system 108 includes sensors 114 that are configured to generate sensor data 116. Examples of the sensors 114 include hardware and/or logical sensors such as an accelerometer, a gyroscope, a camera, a microphone, a clock, biometric sensors, touch input sensors, position sensors, environmental sensors (e.g., for temperature, pressure, humidity, and so on), geographical location information sensors (e.g., Global Positioning System (GPS) functionality), and so forth. In at least some implementations, the sensor data 116 represents raw sensor data collected by the sensors 114. Alternatively or in addition, the sensor data 116 represents raw sensor data from the sensors 114 that is processed to generate processed sensor data, such as sensor data from multiple sensors 114 that is combined to provide more complex representations of wireless device 102 state than can be provided by a single sensor 114.

The device processes 110 are representative of logic that is executable by the wireless device 102a to perform various tasks, examples of which include applications, system processes, an operating system, and so forth. The device processes 110 include a connectivity module 118 which represents functionality for implementing aspects of call type selection based on failure probability described herein. The connectivity module 118, for instance, monitors connectivity status and other wireless-related events of the wireless device 102a. In at least one implementation, the connectivity module 118 executes at an application layer of the wireless device 102a. This is not to be construed as limiting, however, and in other implementations the connectivity module 118 can be implemented in a different layer and/or portions of the wireless device 102a. Further, the connectivity module 118 records wireless-related events in a wireless event database (DB) 120. Generally, the wireless event DB 120 stores data concerning different wireless events, such as call history, call-related events for instances of calls such as call duration, handover events, call failures, fallback events, physical locations of the wireless device 102a during calls, RATs utilized, signal quality, and so forth. As further detailed below, the wireless event DB 120 is utilizable to determine how to connect calls in various different scenarios, such as based on a physical location of the wireless device 102a.

The environment 100 further includes a wireless device 102b which represents a device that communicates wirelessly with the wireless device 102a over the wireless network 104. In at least one implementation, the wireless device 102b represents a different instance of the wireless device 102a, e.g., instances of the functionality discussed with reference to the wireless device 102a also reside on the wireless device 102b. Further example features of the wireless devices 102a, 102b are discussed below with reference to the device 1800 of FIG. 18.

To enable wireless communication over the wireless network 104, the environment 100 includes different network elements 122. Generally, the different network elements 122 provide wireless service utilizing different RATs and are implemented in different ways, such as wireless base stations, wireless nodes, wireless routers, and so forth. In at least one implementation, each network element 122 provides wireless connectivity via a different RAT. Examples of the network elements 122 include connectivity points (e.g., gNB) for 5G New Radio (NR) wireless connectivity, connectivity points (Evolved Node B (eNodeB)) for 4G LTE, 3G base stations, 2G base stations, WiFi access points, and so forth. These examples are not to be construed as limiting and the network elements 122 can be implemented using any suitable RAT. In at least one implementation, at least some of the network elements 122 implement different public data network (PDN) types.

The environment 100 also includes a connectivity service 124 that maintains a service database (DB) 126. Generally, the connectivity service 124 represents a network-based service (e.g., a cloud service) that implements aspects of call type selection based on failure probability described herein. For instance, data from the wireless event DB 120 is propagated to the connectivity service 124 which stores the data as part of the service DB 126. Further, the connectivity service 124 propagates data from the service DB 126 to other devices, such as the wireless device 102b. Generally, this enables call-related intelligence to be shared among various wireless devices.

Figure 2:
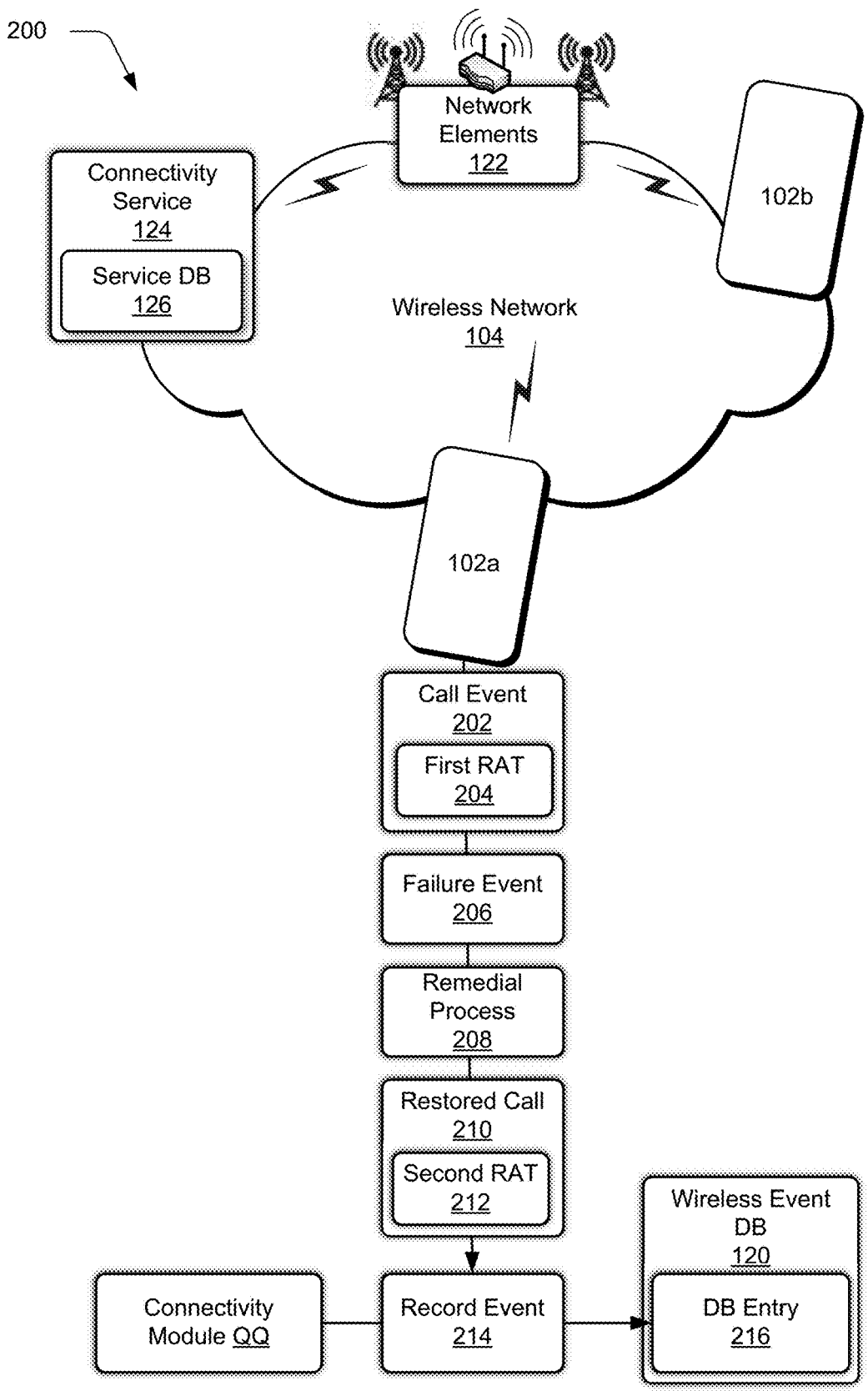
FIG. 2 depicts a scenario for generating call event intelligence in accordance with one or more implementations.

FIG. 2 depicts a scenario 200 for generating call event intelligence in accordance with one or more implementations. In the scenario 200, a call event 202 occurs between the wireless device 102a and the wireless device 102b. The call event 202 represents an instance and/or combination of various call-related events, such as a call initiation by the wireless device 102a to establish a call with the wireless device 102b (or vice-versa), and/or a successfully established call between the wireless devices 102a, 102b. Further, the call event 202 occurs at the wireless device 102a via a first RAT 204. The first RAT 204, for example, represents a default RAT to be utilized by the wireless device 102a at a current location of the wireless device 102a. Further, the first RAT 204 is implemented via a particular network element 122.

In conjunction with the call event 202 a failure event 206 occurs at the wireless device 102a that affects the call event 202. For instance, in an implementation where the call event 202 represents an attempt to initiate a call between the wireless devices 102a, 102b, the failure event 206 represents a failure to establish a successful call between the wireless devices 102a, 102b. In examples where the call event 202 represents a successfully established call between the wireless devices 102a, 102b, the failure event 206 can represent various events such as a call drop event, a reduction in call quality (e.g., a loss of voice transmission for a threshold period of time), a failure of a network element 122 providing the first RAT 204 to the wireless device 102a for the call event 202, and so forth. Accordingly, in response to the failure event 206, a remedial process 208 is initiated to attempt to enable a call of acceptable quality to be established between the wireless devices 102a, 102b. The remedial process 208, for example, attempts to establish a connection of the wireless device 102a via a different RAT than the RAT 204. One non-limiting example of the remedial process is a circuit switched fallback (CSFB) process whereby a switch from connectivity via a packet switched connection (e.g., 4G) to a circuit switched connection (e.g., 3G) is attempted. Another non-limiting example is a redial operation whereby the wireless device 102a automatically redials the wireless device 102b.

Continuing, and based on the remedial process 208, a restored call 210 is established between the wireless devices 102a, 102b and via a second RAT 212. The remedial process 208, for instance, negotiates the restored call 210 over the second RAT 212. Generally, the restored call represents a successfully established call between the wireless devices 102a, 102b and via connectivity of the wireless device 102a via the second RAT 212. Further, the second RAT 212 is implemented via a particular network element 122, e.g., a different network element than implements the first RAT 204.

Further to the scenario 200, the connectivity module 118 performs a record event 214 to generate a DB entry 216 in the wireless event DB 120 for the restored call 210. The DB entry 216, for instance, describes various attributes and conditions that pertain to the restored call 210, such as a physical location of the wireless device 102a and data describing the call event 202 and the first RAT 204, the failure event 206, the remedial process 208, and the restored call 210 over the second RAT 212. As further described below, the DB entry 216 is utilizable to inform subsequent call events. In at least one implementation, the wireless device 102a transmits the DB entry 216 to the connectivity service 124 for use in updating the service DB 126.

Figure 3:
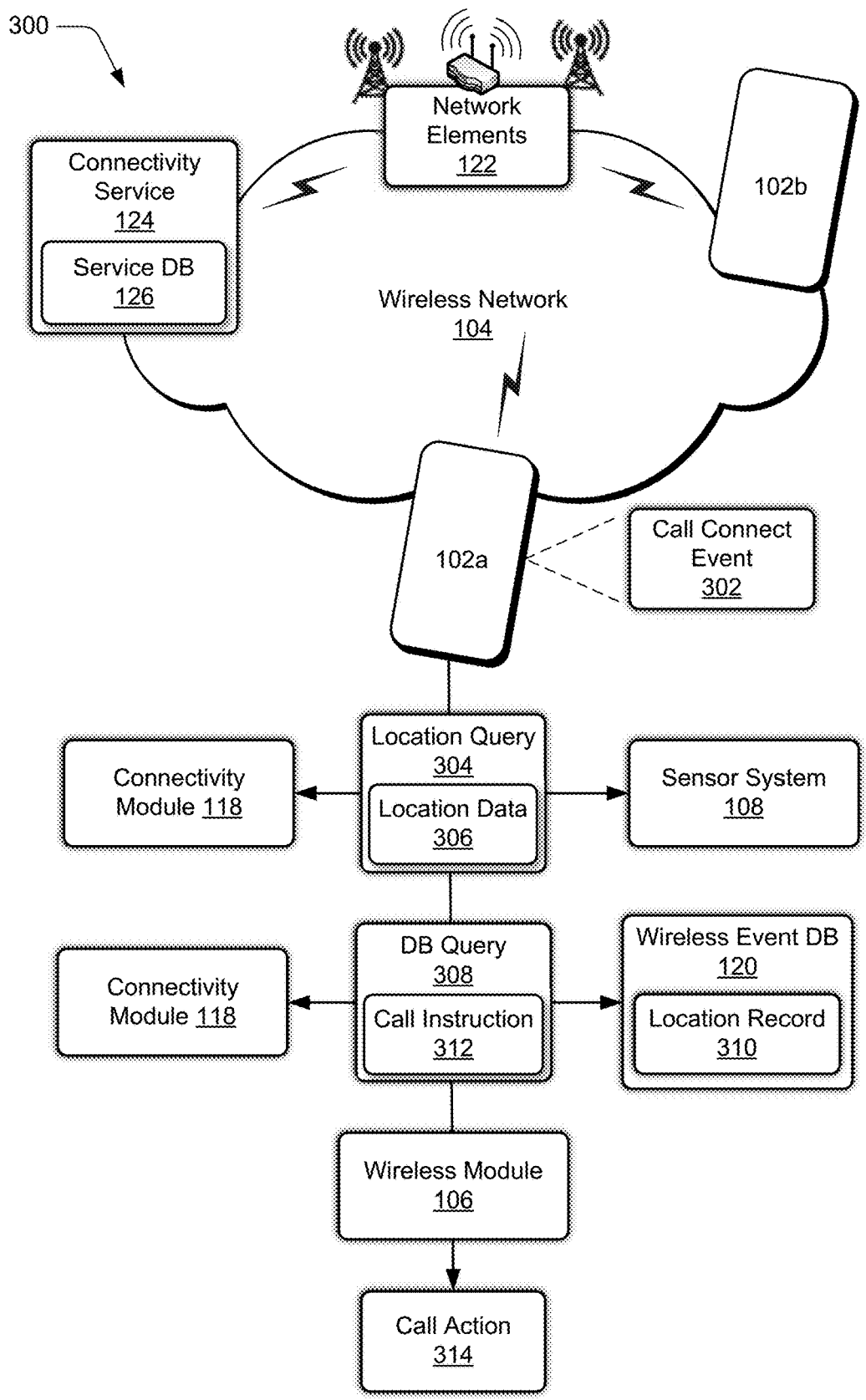
FIG. 3 depicts a scenario for utilizing call event intelligence for a call event in accordance with one or more implementations.

FIG. 3 depicts a scenario 300 for utilizing call event intelligence for a call event in accordance with one or more implementations. In the scenario 300 a call connect event 302 occurs at the wireless device 102a. The call connect event 302, for instance, represents a call initiated at the wireless device 102a to establish a wireless call with the wireless device 102b or an incoming call request from the wireless device 102b. In conjunction with the call connect event 302 the connectivity module 118 submits a location query 304 to the sensor system 108 and receives location data 306 from the sensor system 108. The location data 306, for instance, describes a current location of the wireless device 102a, such as in geographic coordinates and/or other location descriptor.

Continuing, the connectivity module 118 performs a DB query 308 on the wireless event DB 120 utilizing the location data 306 to identify a location record 310 that correlates to the location data 306. As further described below, the wireless event DB 120 includes different location records for physical locations, and the location records specify different wireless-related attributes at the different physical locations. The location record 310, for instance, is generated based on historic call events that occurred at the location identified by the location data 306, such as the DB entry 216 described in the scenario 200. Accordingly, the connectivity module 118 determines a call instruction 312 that is recommended by the location record 310. In at least one implementation, the call instruction 312 indicates a RAT to be utilized to connect a call in response to the call connect event 302. For instance, multiple different RATs are available for wireless connectivity at the current location of the wireless device 102a, and the call instruction 312 specifies which of the RATs to utilize to implement the call connect event 302. In at least one implementation, the location of the wireless device 102a is associated with a default RAT for wireless communication, and the call action instruction specifies a different RAT for wireless communication. For instance, the location record 310 indicates that a RAT other than a default RAT is to be utilized for wireless communication at the location of the wireless device 102a.

Thus, the wireless module 106 initiates a call action 314 based on the call action instruction, such as by dialing a call out to the wireless device 102b or accepting an incoming call request from the wireless device 102b. The call action 314, for example, utilizes a RAT identified by the call instruction 312 to initiate the call action 314.

In at least one implementation, initiating the call action 314 utilizing a RAT identified in the call instruction 312 fails to successfully connect a call between the wireless devices 102a, 102b. In such a scenario, the wireless module 106 may revert to a default RAT for the location of the wireless device 102a, e.g., a different RAT than a RAT specified by the call instruction 312.

As an alternative or additional implementation to obtaining the call instruction 312 in response to the call connect event 302, the connectivity module 118 proactively determines a call instruction such as prior to the call connect event 302. For example, the connectivity module 118 periodically queries the wireless event DB 120 for a location record for a current location of the wireless device 102a to enable an appropriate call instruction for the location to be obtained. Additionally or alternatively the connectivity module 118 queries the wireless event DB 120 for a location record in response to detecting that the wireless device 102a moves more than a threshold distance from a previous location, e.g., m meters. Generally, by proactively obtaining a call instruction, the connectivity module 118 is able to quickly determine a call instruction for performing a call action at a location of the wireless device 102a.

Figure 5:
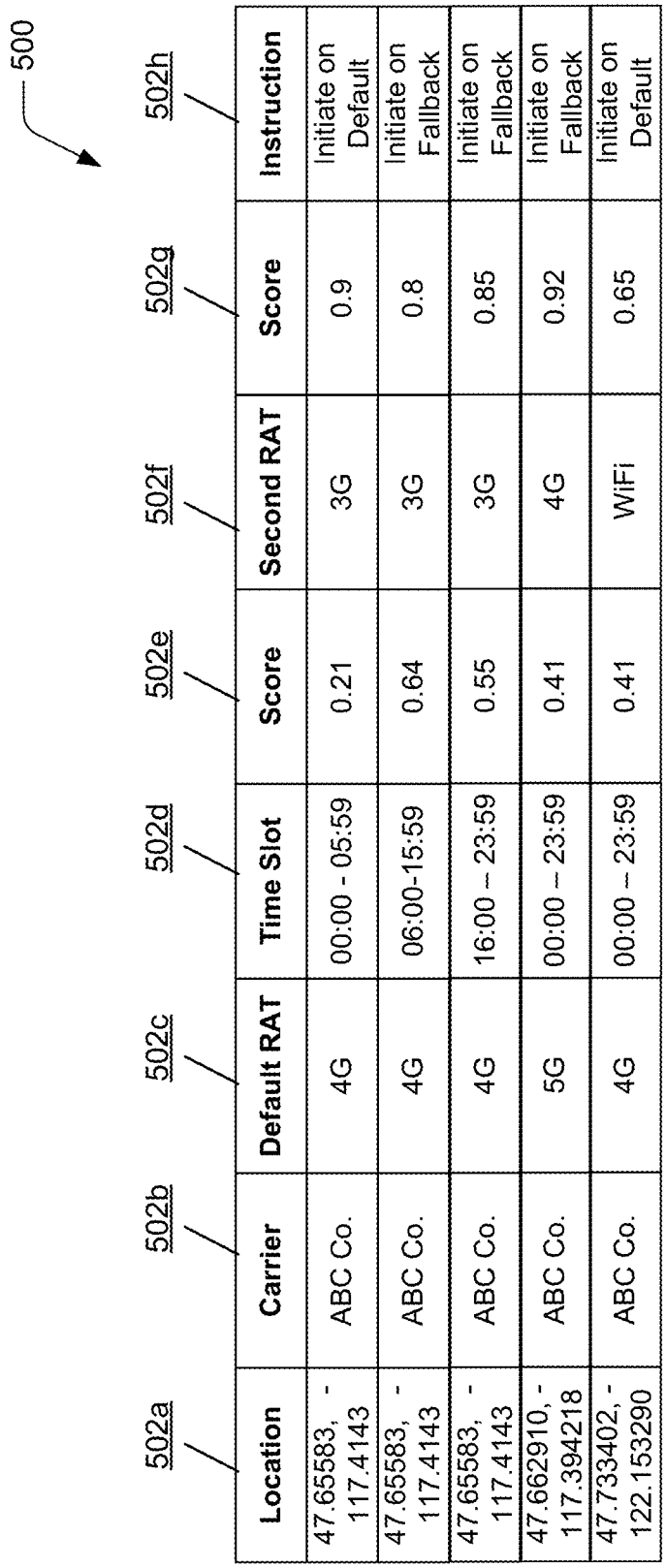
FIG. 5 depicts location records that include call event information for different locations.

FIGS. 4 and 5 depict examples of different entries that are created in the wireless event DB 120 and/or the service DB 126. FIG. 4, for instance, depicts call records 400 that include data entries for different call events. The DB entry 216, for instance, represents a call record populated to the call records 400. The call records 400 include calls for mobile originated (MO) and mobile terminated (MT) calls. The call records include different data columns 402 that represent different call related attributes and are populated with data values for the attributes for different call events. The data columns 402 include:

Call ID 402a: Call identifiers (IDs) for different call events. Each call in the call records 400, for instance, includes a different call ID.

Call date 402b: Date values that indicate a calendar date on which a call event occurred.

Call start time 402c: Time of day when a call event was initiated.

Location 402d: A geographic and/or other physical location at which a call event occurred.

Device ID 402e: An identifier for a wireless device that participated in the call event.

Carrier 402f: An identifier for a wireless carrier that facilitated the call event.

Initial RAT 402g: An identifier for an RAT utilized to initiate the call event.

Failure event 402h: A description of a failure that occurred in conjunction with the call event. Examples of different failures are described throughout this disclosure.

Action 402j: A description of a remedial action that was taken to attempt to recover the call in response to the failure event. Examples of different remedial actions are described throughout this disclosure.

Status 402k: A result of the remedial action. E.g., "OK" indicates that the remedial action was successful, "Fail" indicate that the remedial action failed.

Final RAT 4021: An RAT on which the call occurred after the remedial action, e.g., a fallback RAT on which the call landed.

Duration 402m: A total duration of the call event.

FIG. 5 depicts location records 500 that include call event information for different locations, such as statistics for calls that occur at different geographic locations. For instance, the location record 310 discussed above with reference to the scenario 300 represents an instance of the location records 500. The location records 500, for example, are stored as part of the wireless event DB 120 and/or the service DB 126 and are utilized by the connectivity module 118 to make decisions on how to initiate and/or answer calls that occur at different locations. In at least one implementation, the location records 500 are generated based on call event information extracted from the call records 400. The location records 500 include different data columns 502 that represent different location and call related attributes and are populated with data values for call attributes for different locations. The data columns 502 include:

Location 502a: Different locations, such as via geographic coordinates, location name (e.g., an assigned name), physical address, and so forth. In at least one implementation, an identified location represents a central location point that is associated with a perimeter distance (e.g., n meters) surrounding the central location point. The perimeter distance can be determined in different ways, such as a default distance, a user-defined distance, a learned distance determined based on call event attributes observed within a proximity of the central location point, and so forth. Thus, in such implementations, instances of the locations records 500 apply to positions within the perimeter distance from the identified central point.

Carrier 502b: A wireless carrier that provides wireless service at the location identified at 502a.

Default RAT 502c: A default RAT utilized for call events at the location. Generally, the default RAT can be defined in different ways, such as by a manufacturer of a wireless device, an operating system developer, a wireless carrier that implements a wireless network, and so forth.

Time slot 502d: Identifies a time slot for which a particular location record 500 applies. For instance, wireless attributes at a particular location may vary based on time of day, such as in response to variations in wireless traffic across a 24 hour period.

Probability score 502e: A score that indicates a probability that a call failure event will occur at the location. The score, for instance, is calculated based on observed call failures at the location, such as determined from call events identified in the call records 400 that occurred at the location. In at least one implementation, the probability score is calculated as (number of call failures at the location)/(total call attempts at the location).

Second RAT 502f: An alternative RAT available at the location, e.g., alternatively to the default RAT identified at 502c.

Probability score 502g: A score that indicates a probability that a successful call event will occur at the location utilizing the second RAT 502f This score, for instance, is based on a number of successful calls that have been placed at the location 502a and at a specified time slot 502d. Generally, the probability score 502g can be calculated in different ways, such as based on a (number of successful calls at the location)/(total call attempts at the location) using the second RAT.

Instruction 502h: An instruction to be performed for a call event at the location, e.g., for initiating and/or answering a wireless call. The instruction, for example, is based on a probability score identified at 502e and/or a probability score at 502g. For instance, for the probability score 502e, a threshold probability score is specified and the calculated probability score identified at 502e is compared to the threshold probability score. If the calculated probability score is below the threshold score a first instruction is specified, such as to utilize the default RAT 502b at the location for the call event. However, if the calculated probability score is above the threshold score a second instruction is specified, such as to utilize the second RAT 502f for the call event.

Thus, when the wireless device 102a is to participate in a call event at a particular location identified at 502a (e.g., initiate a wireless call or answer an incoming wireless call), the connectivity module 118 compares a current location of the wireless device 102a to the location records to identify a location record 500 that corresponds to the current location. The connectivity module 118 then communicates an instruction identified at 502h for the location to the wireless module 106. The wireless module 106 can utilize the instruction to participate in the call event at the location, such as to identify an RAT to utilize to initiate or answer a call at the location.

In at least one implementation, the location records 500 are stored as part of the service DB 126 and are periodically and/or dynamically updated by the connectivity service 124. For instance, the service DB 126 receives call records 400 from different wireless devices (e.g., the wireless devices 102a, 102b) and updates the location records 500 based on call status information from the call records 400. Thus, for each location identified in the location records 500 the connectivity service 124 calculates a probability score based on call status information from the call records 400. For instance, for each location, the connectivity service 124 compares a number of call failures to a total number of call attempts to calculate a probability score for the location. The connectivity service 124 thus updates the location records 500 periodically and/or dynamically and propagates updated location records to different devices such as the wireless devices 102a, 102b. Accordingly, this enables wireless devices to obtain current information regarding wireless conditions at different locations, such as to determine an optimal RAT to use at different locations for wireless communication.

Figure 6:
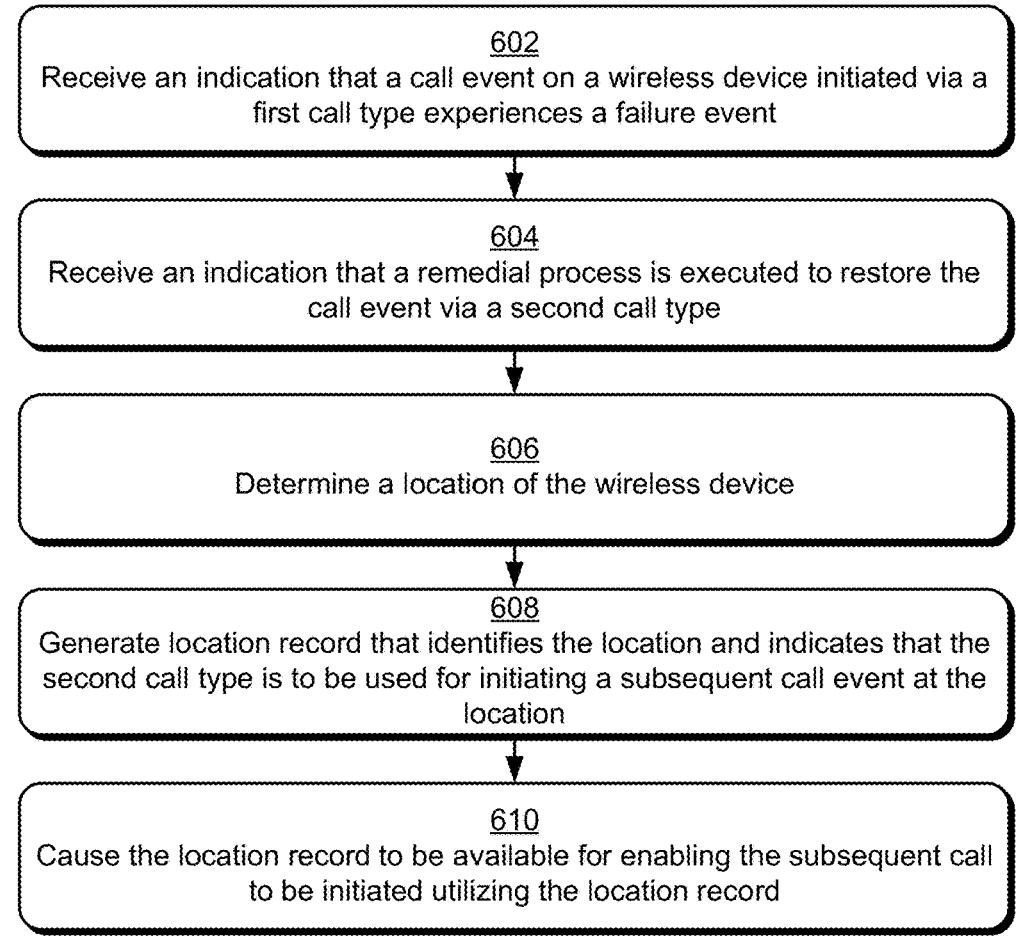
FIG. 6 is a flow diagram that depicts a method for generating a location record for wireless calls in accordance with one or more implementations.

FIG. 6 depicts a method 600 for generating a location record for wireless calls in accordance with one or more implementations. At 602 an indication is received that a call event on a wireless device initiated via a first call type experiences a failure event. The connectivity module 118, for instance, detects a failure of a call event initiated via a particular call type (e.g., a particular RAT, a packet switched call, etc.) occurs on the wireless device 102a. In at least one implementation, the wireless module 106 notifies the connectivity module 118 of the failure and includes information about the failure, such as a call type involved in the failure, e.g., RAT being used.

At 604 an indication is received that a remedial process is executed to restore the call event via a second call type. For example, the connectivity module 118 determines that the call event is restored via a different call type than an initial call type used to initiate the call event. The remedial process can be implemented in various ways, such as a CSFB, a redial operation (e.g., a silent redial), a wireless handover, and so forth. In at least one implementation, the wireless module 106 notifies the connectivity module 118 of the remedial procedure and includes information about the procedure, such as a call type used to remediate the call event, e.g., RAT used.

At 606 a location of the wireless device is determined. The connectivity module 118, for example, determines a current geographic location of the wireless device 102a. Generally, location information for determining a location of the wireless device 102a can be obtained in various ways, such as from the sensor system 108, the wireless module 106, and so forth. The wireless module 106, for example, obtains location information from a network element 122 indicating a current location of the wireless device 102, such as based on an identifier for a network element 122 to which the wireless device 102 is most recently connected. The network element 122, for example, represents a network element involved in the call failure and/or the remedial procedure.

At 608 a location record is generated that identifies the location and indicates that the second call type is to be used for initiating a subsequent call event at the location. For instance, the connectivity module 118 generates a location record 500 for the location in the wireless event DB 120 and populates the location record with various information about the call event failure and the remedial process. Examples of different information for populating a location record are detailed above. In at least one implementation, generating the location record includes updating an existing location record with information about the failure event and the remedial process. Further, generating the location record includes generating and/or updating a probability score for the location and the first call type. The probability score, for instance, exceeds a failure threshold for the first call type and thus indicates that the second call type is recommended for initiating a call event at the location.

At 610 the location record is caused to be available for enabling the subsequent call to be initiated utilizing the location record. The connectivity module 118, for example, stores the location record as part of the wireless event DB 120 and is able to access the location record to generate notifications based on the location record in response to subsequent call events. Alternatively or additionally, the location record is stored by the connectivity service 124 as part of the service DB 126 and can be propagated to different wireless devices for use in establishing wireless calls at an associated location.

While the method 600 is discussed in the context of the connectivity module 118, it is to be appreciated that aspects of the method are performable by the connectivity service 124 additionally or alternatively to the connectivity module 118. The connectivity service 124, for example, obtains information describing call event failures and remedial processes from different wireless devices and utilizes this information to generate and update call records and location records in the service DB 126. The connectivity service 124 can then propagate this information to different wireless devices for use in initiating call events at different locations.

Figure 7:
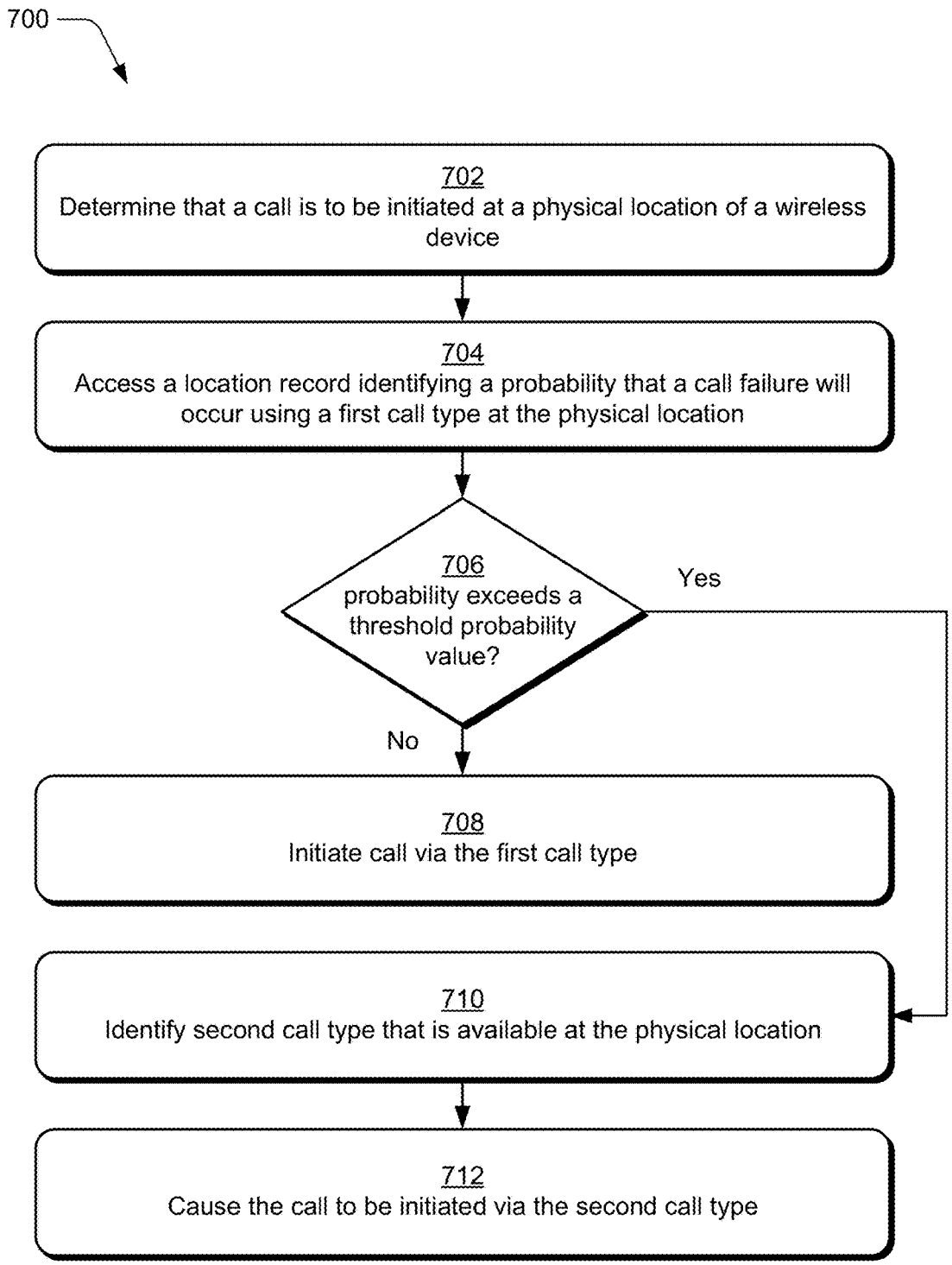
FIG. 7 is a flow diagram that depicts a method for utilizing a location record for a wireless call in accordance with one or more implementations.

FIG. 7 depicts a method 700 for utilizing a location record for a wireless call in accordance with one or more implementations. At 702 a determination is made that a call is to be initiated at a physical location of a wireless device. The connectivity module 118, for instance, determines that a call is to be initiated at the wireless device 102a. Generally, this determination can be made in various ways, such as based on a call notification from the wireless module 106, detecting that a user dials a number at the wireless device 102a, an instruction on the wireless device 102a to initiate a call, and so forth.

At 704 a location record is accessed identifying a probability that a call failure will occur using a first call type at the physical location. For example, the connectivity module 118 accesses a location record 500 for the physical location, and the location record identifies a probability that a call failure will occur using a first call type (e.g., default call type) at the physical location. Generally, the call record 500 may be stored as part of the wireless event DB 120 and/or the service DB 126. For instance, in at least one implementation and in response to determining that the call is to be initiated, the connectivity module 118 queries the wireless event DB 120 and/or the service DB 126 for a location record for the physical location. Further, the query includes identifying information for the location, such as geographical coordinates received from the sensor system 108.

At 706 it is determined whether the probability exceeds a threshold probability value. A threshold probability value, for instance, is predefined and applied to the call records 500 as a whole and/or such a threshold value is defined for individual call records. In at least one implementation, the threshold probability value is user defined, such as via user interaction with the connectivity module 118. If the probability does not exceed the threshold probability value ("No"), at 708 the call is initiated via the first call type. The connectivity module 118, for example, determines that the probability of call failure via the first call type at the physical location does not exceed the threshold probability value, and thus does not instruct the wireless module 106 to initiate the call via a call type other than the first call type. For instance, the connectivity module 118 instructs the wireless module 106 to proceed with initiating the call via the first call type, or the connectivity module 118 simply refrains from notifying the wireless module 106 and thus the call is initiated by the wireless module via a default call process that utilizes the first call type. Generally, the first call type represents a particular RAT and/or a packet switched call.

If the probability exceeds the threshold probability value ("Yes"), at 710 a second call type is identified that is available at the physical location. The connectivity module 118, for instance, identifies a second call type (e.g., a secondary and/or fallback call type) from the location record for the physical location. At 712 the call is caused to be initiated via the second call type. The connectivity module 118, for example, instructs the wireless module 106 to initiate the call via the second call type, such as a second RAT and/or a circuit switched call.

Generally, after the call process is initiated at 710 or 712, the connectivity module 118 continues to monitor the call initiation process and updates the location record based on a status of the call process. For instance, if a failure occurs as part of the call process, the connectivity module 118 updates the location record to reflect this failure. The method 600 above, for example, is performed in conjunction with the call initiation and call established process.

Figure 8:
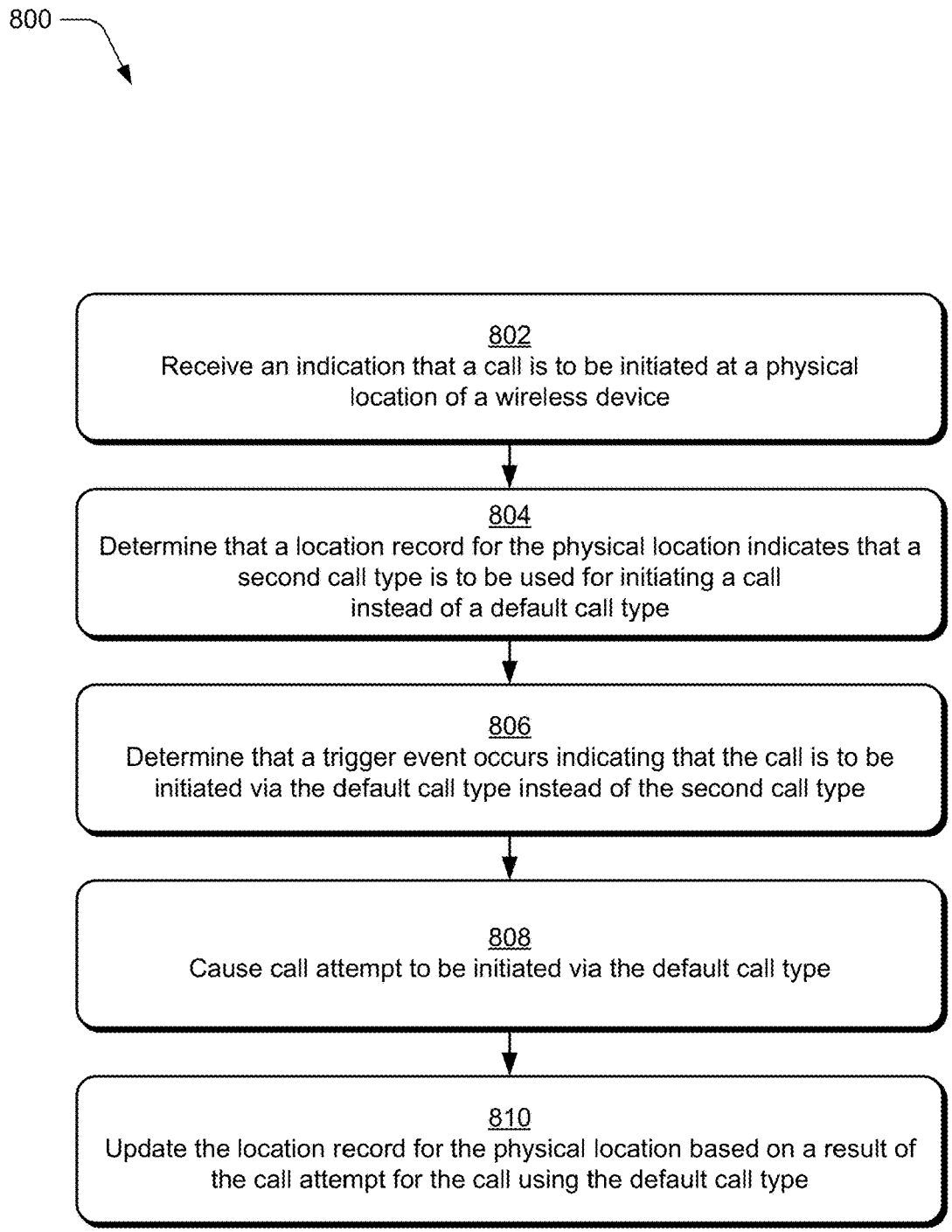
FIG. 8 is a flow diagram that depicts a method for updating a location record for wireless calls in accordance with one or more implementations.

FIG. 8 depicts a method 800 for updating a location record for wireless calls in accordance with one or more implementations. In at least one implementation, the method 800 is performed after a location record is generated, such as after the method 600 is performed. At 802 an indication is received that a call is to be initiated at a physical location of a wireless device. The connectivity module 118, for instance, determines that a call is to be initiated via the wireless device 102*a*. Example ways for determining that a call is to be initiated are described above.

At 804 it is determined that a location record for the physical location indicates that a second call type is to be used for initiating a call instead of a default call type. A location record 500 from the wireless event DB and/or the service DB, for instance, indicates a probability of failure for the default call type that exceeds a threshold probability value. Generally, the default call type represents a default call type for the physical location, and the second call type represents an available call type at the physical location that is usable should the primary call type fail, e.g., a fallback call type. Generally, the default call type can be specified in different ways, such as by a manufacturer of a wireless device, an operating system developer, a wireless carrier that implements a wireless network, and so forth. Different ways for generating and utilizing location records are detailed above.

At 806 it is determined that a trigger event occurs indicating that the call is to be initiated via the default call type instead of the second call type. The trigger event, for instance, represents an indication that a call record for the physical location is to be refreshed. Examples of different trigger events include an expiration of a timer for the location record, a call count threshold at the physical location, an indication of a change in a wireless network attribute at the physical location, etc. A location record for the physical location, for instance, is associated with a timer (e.g., d days) such that after expiration of the timer calls at the physical location revert to a default call type. As another example, the location record is associated with a call count threshold (e.g., c calls) such that after the threshold number of calls are initiate at the physical location, call behavior reverts to the default call type. As yet another example, the connectivity module 118 monitors network attributes at the physical location, such as based on network information received from the wireless module 106. Thus, if the connectivity module 118 detects a change in a network attribute at the physical location, the connectivity module 118 revers to the default call type. Examples of such changes in network attributes including a change in available call types at the physical location (e.g., the availability of a new RAT), a change in detected signal quality at the physical location, a notification from the connectivity service 124 and/or a network element 122 of a change in a network attribute at the physical location, etc.

At 808 a call attempt is caused to be initiated via the default call type. The connectivity module 118, for instance, instructs the wireless module 106 to initiate the call via the default call type. For instance, even if the location record recommends that the second call type be used for initiating the call (e.g., based on a probability score for the physical location), the connectivity module 118 instructs the wireless module to utilize the default call type.

At 810 the location record for the physical location is updated based on a result of the call attempt for the call using the default call type. For example, the connectivity module observes the call process and updates the location record based on the call process, such as based on whether the call is successfully initiated and maintained via the default call type, whether a failure occurs as part of the call via the default call type, and so forth. For instance, if the call is successful via the default call type, the connectivity module 118 updates the location record such as by resetting (e.g., to zero) and/or decrementing the probability score for the physical location. Generally, this enables the connectivity module 118 to update the location record to reflect current wireless call conditions at the physical location.

Accordingly, the described techniques are able to monitor network conditions and device location and proactively initiate actions to attempt to avoid call failures. Consider now a discussion of techniques for multiple call types for a call event which can be implemented separately and/or in combination with the techniques described above.

Figure 9:
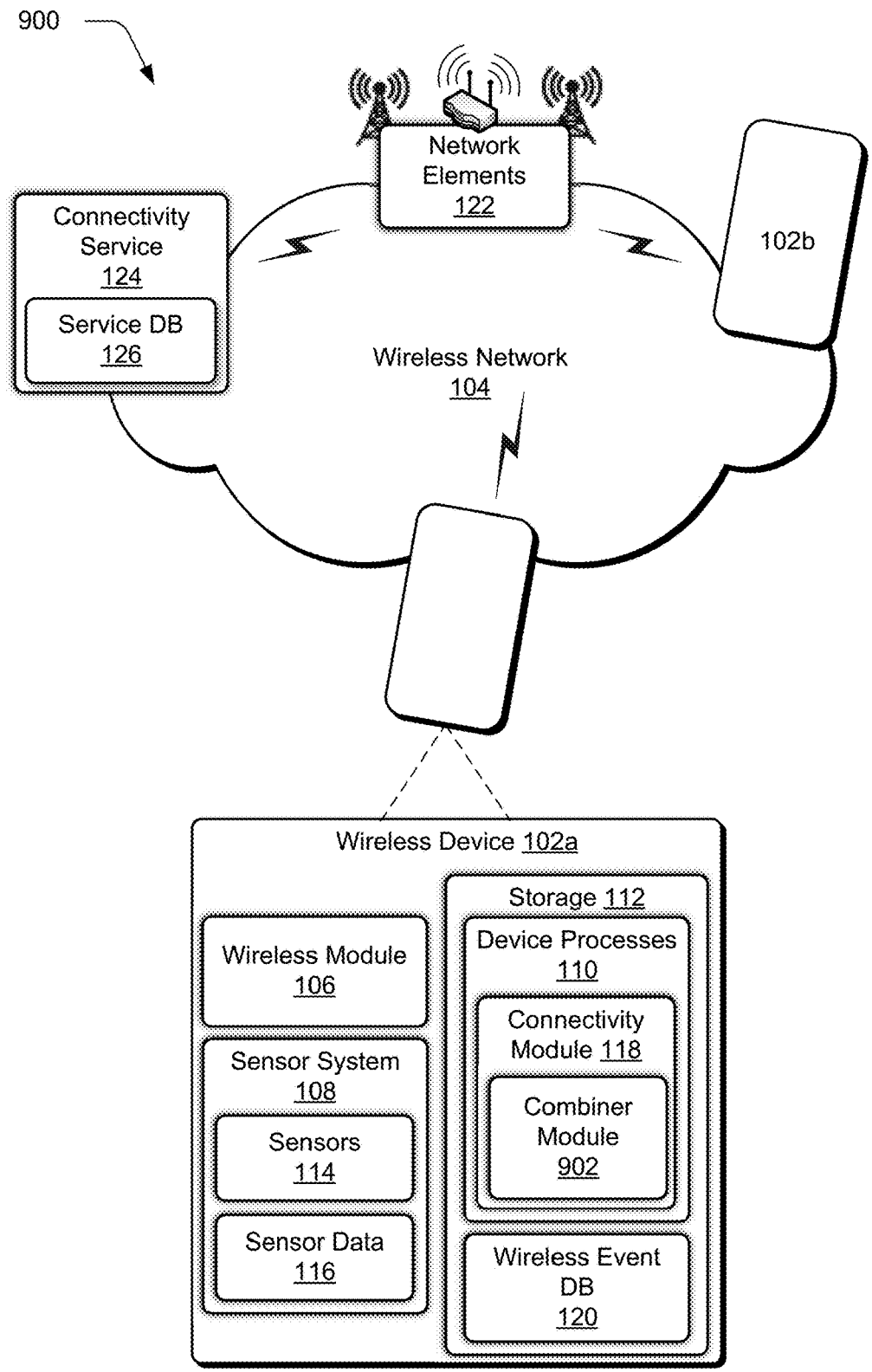
FIG. 9 illustrates an example environment in which aspects of multiple call types for a call event can be implemented.

FIG. 9 illustrates an example environment 900 in which aspects of multiple call types for a call event can be implemented. The environment 900 generally represents an extension and/or variation on the environment 100 and thus please refer to the discussion of the environment 100 for example description of some of the entities depicted in the environment 900 but not expressly described in this section. Generally, according to techniques for multiple call types for a call event, the connectivity module 118 includes functionality to cause connection to multiple different call types (e.g., RATs) as part of a voice call. For instance, and as detailed below, the connectivity module 118 detects a degradation in call quality over a default call type and initiates a process to connect to a second call type, e.g., while the default call type remains connected. In at least one implementation, this includes connecting the wireless device 102*a* to multiple different network elements 122 each for a different call type. Accordingly, both the default call type and the second call type can remain active to transmit and receive call data as part of the call. Further, if the default call type fails (e.g., drops the call connection), the second call type can remain active for the call. In at least one implementation, when a call is connected via a default call type, the connectivity module 118 proactively connects a second call type for the call without waiting for a call anomaly of the default call type.

Accordingly, in the environment 900, the connectivity module 118 includes a combiner module 902 which is representative of functionality to aggregate data packets and/or speech frames across different call types (e.g., different RATs) to provide increased call performance. In at least one implementation, the term "speech frame" refers to data frames that include voice data, such as generated and exchanged as part of a circuit switched call. For instance, when the wireless device 102*a* is connected using multiple different call types for a call, the wireless device 102*a* receives packets and/or speech frames via each of the call types and the connectivity module 118 leverages the combiner module 902 to aggregate the packets and/or speech frames from each call type into a packet and/or speech frame stream that is decoded and output as user-consumable media, such as audible voice output, visual media, and so forth, on the wireless device 102*a*.

Figure 10:
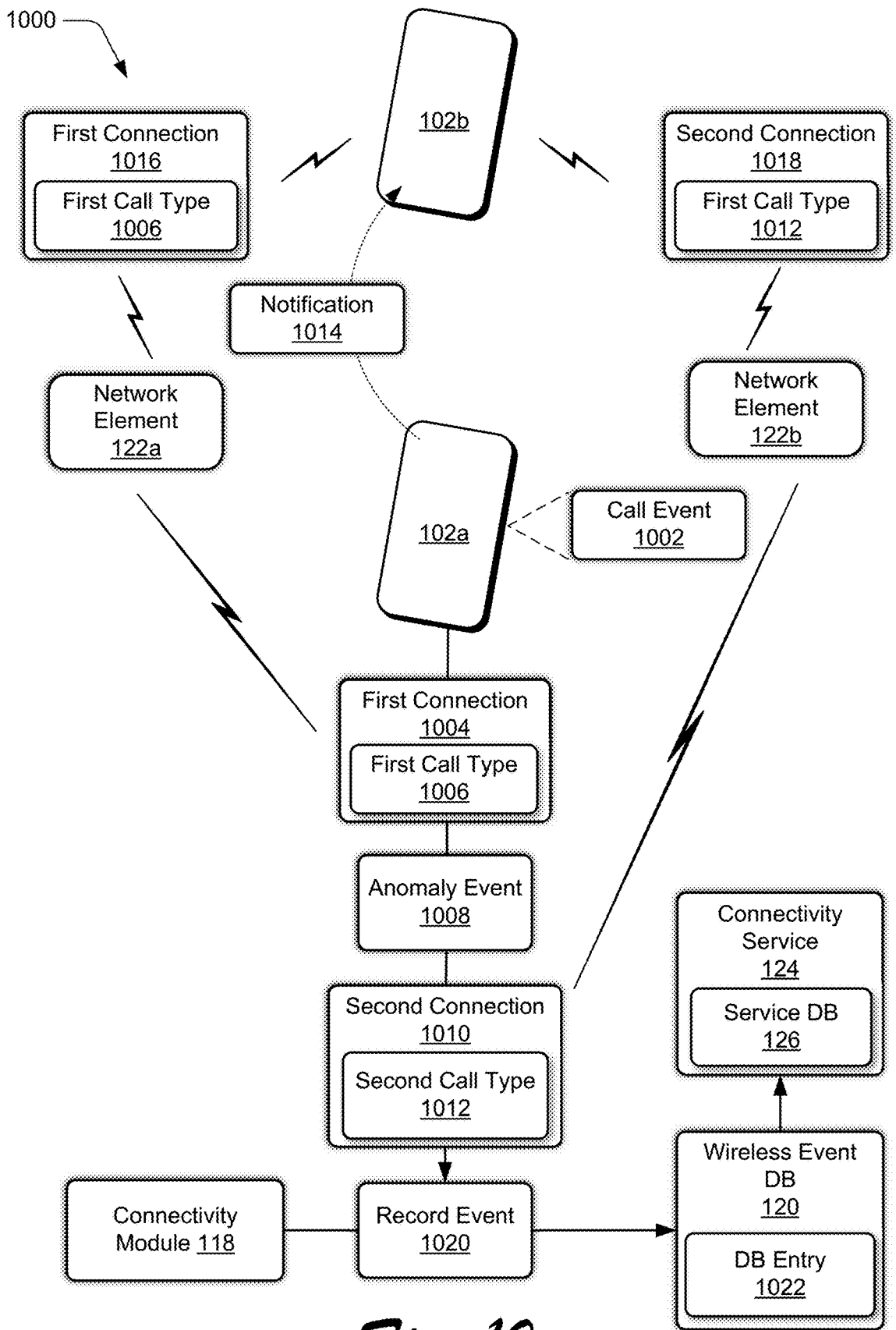
FIG. 10 depicts a scenario for multiple call types for a call event in accordance with one or more implementations.

FIG. 10 depicts a scenario 1000 for multiple call types for a call event in accordance with one or more implementations. In the scenario 1000 a call event 1002 is initiated via a first connection 1004 of a first call type 1006 between the wireless device 102*a* and the wireless device 102*b*. The first connection 1004, for example, is connected via a network element 122*a* which provides connectivity for the first call type 1006, e.g., via a first RAT. As part of the call event 1002 a call anomaly event 1008 is detected. Generally, the anomaly event 1008 occurs based on an instance of a variety of different call anomaly types, such as a call failure, a call drop (e.g., based on a Real-time Transport Protocol (RTP) timeout), a degradation in call quality (e.g., based on a low MOS), a failure of a network element 122*a*, and so forth.

Accordingly, in response to the anomaly event 1008, the connectivity module 118 causes a second connection 1010 to be established via a second call type 1012. The second connection 1010, for instance, is provided by a network element 122*b* which provides connectivity via the second call type 1012, e.g., a via a second, different RAT. In at least one implementation, the connectivity module 118 instructs the wireless module 106 to establish the second connection 1010, e.g., while the first connection 1004 remains connected between the wireless devices 102*a*, 102*b*. Thus, the call event 1002 proceeds utilizing the first call type 1006 and the second call type 1012, e.g., concurrently and/or simultaneously.

In at least one implementation, in conjunction with establishing the second connection 1010, the connectivity module 118 on the wireless device 102*a* communicates a notification 1014 to the wireless device 102*b* notifying the wireless device 102*b* about various information pertaining to the anomaly event 1008 and the second connection 1010. The notification 1014, for instance, notifies the wireless device 102*b* that the wireless device 102*a* established/is establishing the second connection 1010 via the second call type 1012. For example, the wireless device 102*b* participates in the call event 1002 via a first connection 1016 of the first call type 1006. In at least one implementation, the wireless device 102*b* includes an instance of the connectivity module 118, and thus communication between the wireless devices 102*a*, 102*b* can occur (e.g., communication of the notification 1014) between respective instances of the connectivity module 118. Thus, in response to the notification 1014, the wireless device 102*b* establishes a second connection 1018 to the wireless device 102*a* via the second call type 1012, enabling the call event 1002 to proceed between the wireless devices 102*a*, 102*b* and via the first call type 1006 and the second call type 1012.

In at least one implementation, the connectivity module 118 performs a record event 1020 which generates a DB entry 1022 in the wireless event DB 120 and based on the anomaly event 1008 and the second connection 1010. Alternatively or additionally, the DB entry 1022 can be communicated to the connectivity service 124 and stored as part of the service DB 126. The DB entry 1022, for instance, identifies various attributes of the anomaly event 1008 and the second connection 1010, such as a date and time of the call event 1002, a physical location of the wireless device 102*a* at the time of the call event 1002 and/or the anomaly event 1008, the first call type 1006, a nature of the anomaly event 1008 (e.g., a failure type), the second call type 1012, and so forth. The DB entry 1022, for instance, is implemented as a location record 500 for the call event 1002. Various attributes of location records 500 are detailed above. Thus, the DB entry 1022 is usable to connect subsequent call events at the particular location, such as proactively and without waiting for a call anomaly event.

Figure 11:
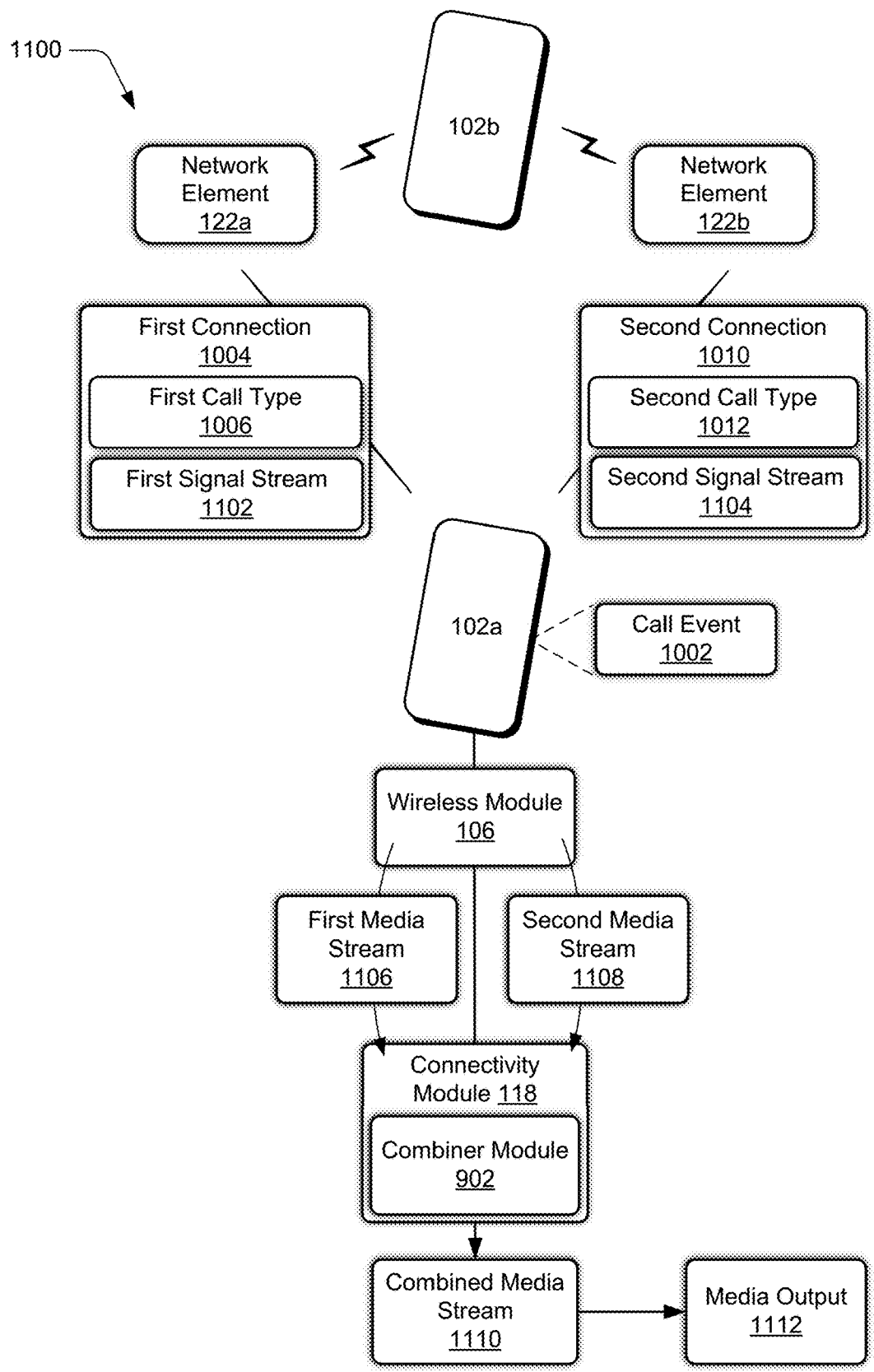
FIG. 11 depicts a scenario for combining packets from multiple different call types in accordance with one or more implementations.

FIG. 11 depicts a scenario 1100 for combining media from multiple different call types in accordance with one or more implementations. The scenario 1100, for instance, is implemented in conjunction with the scenario 1000. In the scenario 1100, the wireless device 102*a* receives a first signal stream 1102 via the first connection 1004 and the first call type 1006 provided by the network element 122*a*, and receives a second signal stream 1104 via the second connection 1010 and the second call type 1012 provided by the network element 122*b*. In at least one implementation, the network element 122*a* implements a first public data network (PDN) that provides the first connection 1004, and the network element 122*b* implements a second, different type of PDN that provides the second connection 1010. Alternatively or additionally, at least one of the network elements 112*a*, 112*b* implements a circuit switched network that provides circuit switched connectivity via one of the first connection 1004 or the second connection 1010, respectively. Generally, the first signal stream 1102 and the second signal stream 1104 are part of the call event 1002, e.g., represent wireless RF downlink media streams received from the wireless device 102*b*. Further, the first signal stream 1102 and the second signal stream 1104 can include IP-based media (e.g., packet data) and/or one of the first signal stream 1102 or the second signal stream 1104 includes circuit switched media, such as voice media (e.g., speech frames) as part of a circuit switched call.

Further to the scenario 1100, the wireless module 106 receives the first signal stream 1102 and converts the first signal stream 1102 to a first media stream 1106, and receives the second signal stream 1104 and converts the second signal stream 1104 to a second media stream 1108. For instance, in an packet switched call scenario, the first media stream 1106 and the second media stream 1108 represent different IP-based media streams, e.g., packet streams. In a scenario including a circuit switched signal stream, the first media stream 1106 includes an IP-based media stream and the second media stream 1108 includes a circuit switched media stream. The combiner module 902 processes the first media stream 1106 and the second media stream 1108 to generate a combined media stream 1110. In an IP-based call scenario, for instance, the combiner module 902 combines packets from the first media stream 1106 and packets from the second media stream 1108 to generate the combined media stream 1110 as a combined packet stream. Alternatively or additionally, in a scenario that involves circuit switched media (e.g., voice media) and packet switched media, the first media stream 1106 and the second media stream 1108 include speech frames extracted from the first signal stream 1102 and the second signal stream 1104, and thus the combiner module 902 combines speech frames from the respective media streams to generate the combined media stream 1110.

The combiner module 902 is operable to combine the first media stream 1106 and the second media stream 1108 in various ways to generate the combined media stream 1110. For instance, in an packet switched call scenario where the first media stream 1106 and the second media stream 1108 represent different packet streams, the combiner module 902 compares the first media stream 1106 to the second media stream 1108 to identify corresponding packets between the two packet streams, such as based on packet timestamp, sequence number in each packet stream, media content data in each packet, and so forth. The combiner module 902 can then combine the packet streams such as by removing redundant packets that are lower in quality, combining redundant packets to generate higher quality packets, and so forth, to generate the combined media stream 1110. Alternatively or additionally, where the first media stream 1106 represents an packet switched media stream and the second media stream 1108 represents a circuit switched media stream, the combiner module 902 combines speech frames extracted from the respective media streams to generate the combined media stream 1110 as a combined aggregation of speech frames.

The combined media stream 1110 is then output as media output 1112, e.g., audible and/or visual output. For instance, in an packet switched call scenario, digital packets of the combined media stream 1110 are converted into analog output as the media output 1112. Alternatively or additionally in an IP/circuit switched scenario, combined speech frames from the combined media stream 1110 are output as the media output 1112.

Figure 12A:
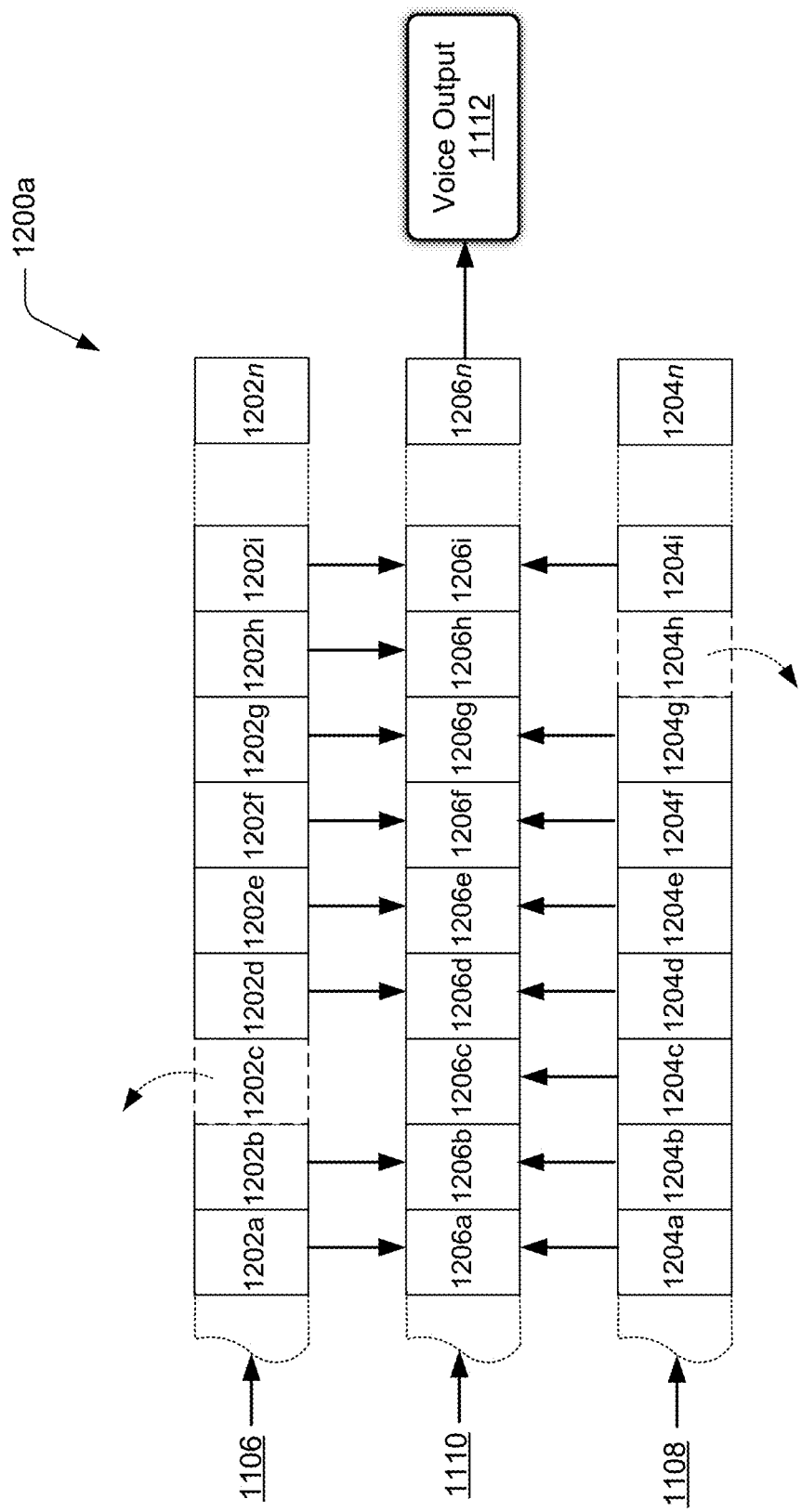
FIG. 12*a* depicts a scenario for combining media streams from multiple different packet switched call types in accordance with one or more implementations.

FIG. 12*a* depicts a scenario 1200*a* for combining media streams from multiple different packet switched call types in accordance with one or more implementations. The scenario 1200*a*, for instance, depicts an example way that the combiner module 902 generates the combined media stream 1110 in an packet switched call scenario. The scenario 1200*a* depicts portions of the first media stream 1106, the second media stream 1108, and the combined media stream 1110 such as generated by the combiner module 902. Further, in the scenario 1200*a*, the first media stream 1106 and the second media stream 1108 represent packet switched packet streams that are combined to generate a combined packet stream represented by the combined media stream 1110.

For instance, various packets from the first media stream 1106 and the second media stream 1108 are combined together to form packets of the combined media stream 1110. Generally, packets of the first media stream 1106 and the second media stream 1108 are correlated into corresponding media packets 1202 and media packets 1204, respectively. For instance, a media packet 1202*a* from the first media stream 1106 corresponds to a media packet 1204*a* from the second media stream 1108, such as based on correlating timestamps, sequence identifiers, etc., for the respective packets 1202*a*, 1204*a*.

As one example operation of the combiner module 902, the packet 1202*a* from the first media stream 1106 and the packet 1204*a* from the second media stream 1108 are combined to form a packet 1206*a* of the combined media stream 1110. In at least one implementation, generating the packet 1206*a* includes merging data from the packets 1202*a*, 1204*a* into the packet 1206*a*. For instance, media data from the packets 1202*a*, 1204*a* is compared and combined to generate the packet 1206*a*. Generally, this enables data from both of the packets 1202*a*, 1204*a* to be utilized to provide data redundancy and provide a more robust representation of speech included in the packets than would be provided by a single packet.

As another example operation of the combiner module 902, a packet 1202*c* of the first media stream 1106 is disregarded such that a packet 1204*c* of the second media stream 1108 is utilized to generate a packet 1206*c* of the combined media stream 1110. The connectivity module 118, for instance, determines that the packet 1202*c* experiences an error condition such as latency, jitter, packet loss, burstiness, etc., and thus is not to be used for the combined media stream 1110. Accordingly, the packet 1202*c* is ignored and/or discarded by the combiner module 902. Further, a packet 1204*h* of the second media stream 1108 is disregarded such that a packet 1202*h* of the first media stream 1108 is utilized to generate a packet 1206*h* of the combined media stream 1110. The connectivity module 118, for instance, determines that the packet 1204*h* experiences an error condition and thus is not to be used for the combined media stream 1110. Accordingly, different packet streams are combinable in different ways to generate a combined packet stream. Further, the combined media stream 1110 is utilized to generate the media output 1112.

FIG. 12*b* depicts a scenario 1200*b* for combining media streams from an packet switched media stream and a circuit switched media stream in accordance with one or more implementations. The scenario 1200*b*, for instance, depicts an example way that the combiner module 902 generates the combined media stream 1110 in a combination packet switched media stream and circuit switched media stream scenario. The scenario 1200*b* depicts portions of the first media stream 1106, the second media stream 1108, and the combined media stream 1110 such as generated by the combiner module 902. Further, in the scenario 1200*b*, the first media stream 1106 represents speech frames that are generated from (e.g., decoded from) an packet switched media stream and the second media stream 1108 represents speech frames that are generated from a circuit switched media stream. Accordingly, the speech frames from the packet switched media stream 1106 and the circuit switched media stream 1108 are combined to generate a combined speech frame stream represented by the combined media stream 1110.

For instance, various speech frames from the first media stream 1106 and the second media stream 1108 are combined together to form speech frames of the combined media stream 1110. Generally, speech frames of the first media stream 1106 and the second media stream 1108 are correlated into corresponding speech frames 1208 and speech frames 1210, respectively. For instance, a speech frame 1208*a* from the first media stream 1106 corresponds to a speech frame 1210*a* from the second media stream 1108, such as based on correlating timestamps, sequence identifiers, etc., for the respective speech frames 1208*a*, 1210*a*.

As one example operation of the combiner module 902, the speech frame 1208*a* from the first media stream 1106 and the speech frame 1210*a* from the second media stream 1108 are combined to form a speech frame 1212*a* of the combined media stream 1110. In at least one implementation, generating the speech frame 1212*a* includes merging speech content (e.g., speech data) from the speech frames 1208*a*, 1210*a* into the speech frame 1212*a*. For instance, speech content from the speech frames 1208*a*, 1210*a* is compared and combined to generate the speech frame 1212*a*. Generally, this enables speech media from both of the speech frames 1208*a*, 1210*a* to be utilized to provide media redundancy and provide a more robust representation of speech included in the speech frames than would be provided by a single speech frame.

As another example operation of the combiner module 902, a speech frame 1208*c* of the first media stream 1106 is disregarded such that a speech frame 1210*c* of the second media stream 1108 is utilized to generate a speech frame 1212*c* of the combined media stream 1110. The connectivity module 118, for instance, determines that the speech frame 1208*c* includes low quality speech media (e.g., based on detected media data quality and/or errors) and thus is not to be used for the combined media stream 1110. Accordingly, the speech frame 1208*c* is ignored and/or discarded by the combiner module 902. Further, a speech frame 1210*h* of the second media stream 1108 is disregarded such that a speech frame 1208*h* of the first media stream 1108 is utilized to generate a speech frame 1212*h* of the combined media stream 1110. The connectivity module 118, for instance, determines that the speech frame 1208*h* experiences an error condition and/or a poor quality condition and thus is not to be used for the combined media stream 1110. Accordingly, different media streams are combinable in different ways to generate a combined media stream. Further, the combined media stream 1110 is utilized to generate the media output 1112, such as for audible voice output. Accordingly, techniques for utilizing multiple call types for a wireless call are operable to combine a variety of different types of call media into a coherent media stream for output as part of a call event.

Figure 13:
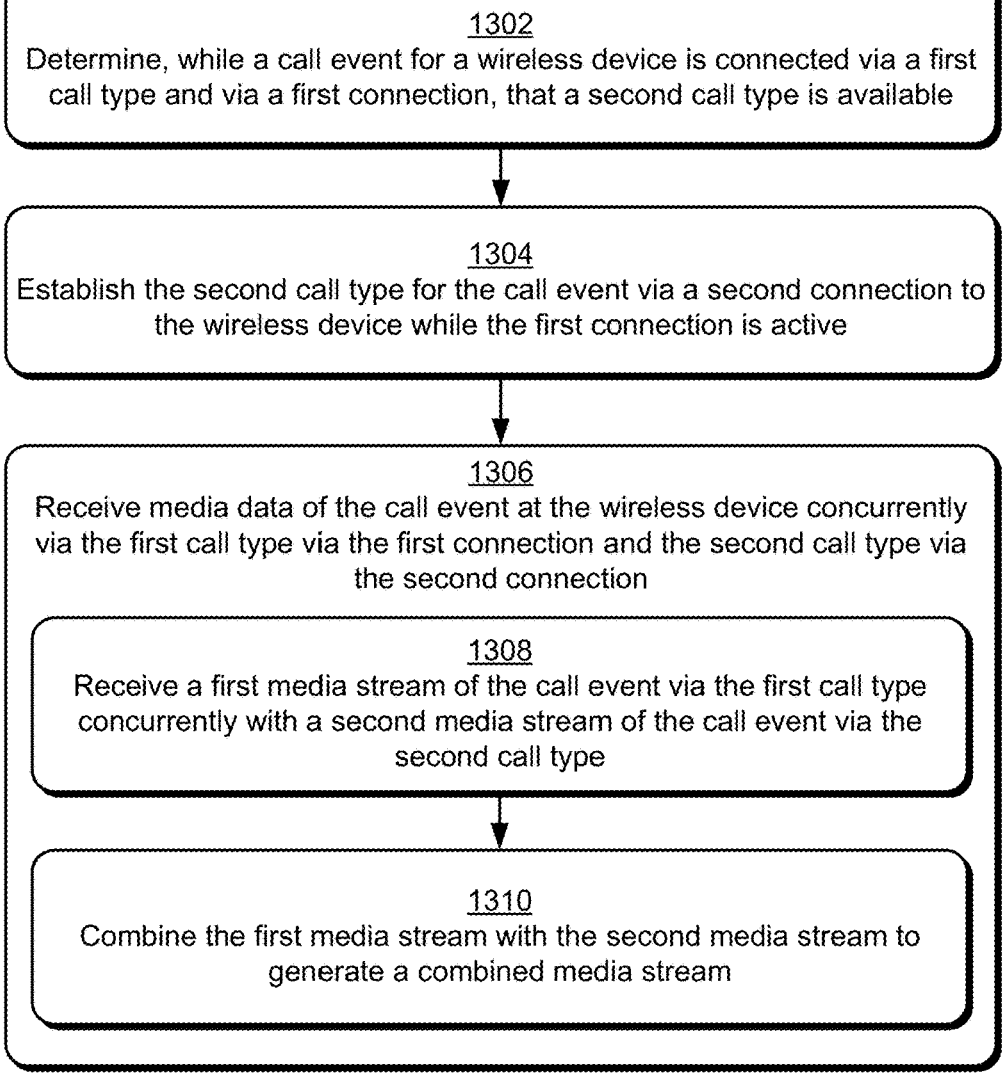
FIG. 13 is a flow diagram that depicts a method for utilizing multiple call types for a wireless call in accordance with one or more implementations.

FIG. 13 depicts a method 1300 for utilizing multiple call types for a wireless call in accordance with one or more implementations. At 1302 it is determined, while a call event for a wireless device is connected via a first call type and via a first connection, that a second call type is available. The connectivity module 118, for instance, determines that a second call type is available while the wireless device 102*a* is connected to a call event via a first call type. In at least one implementation, the connectivity module 118 determines that the second call type is available in response to detecting a call anomaly event that occurs as part of the call event over the first call type. Alternatively or additionally, the connectivity module 118 determines that based on a physical location of the wireless device 102*a*, the second call type is available.

At 1304 the second call type is established for the call event via a second connection to the wireless device while the first connection is active. In at least one implementation, steps 1302 and 1304 are performed in response to detecting a call anomaly event in relation to the first call type or are performed independent of a call anomaly event, e.g., without detecting a call anomaly event. For instance, the connectivity module 118 instructs the wireless module 106 to establish the second connection and the second call type for the call event. In at least one implementation, this causes the wireless module to connect the wireless device 102*a* to a second network element 122 while the wireless device 102*a* is connected to a first network element 122 for the first call type. Thus, the wireless device 102*a* is simultaneously and/or concurrently connected to the first call type via the first wireless connection and the second call type via the second wireless connection. Generally, the first call type and the second call type can be implemented as a variety of different call types, such as a packet switched call and a circuit switched call, two Internet Protocol (IP)-based calls, and so forth. As used herein, packet switched calls include various types of calls such as Internet Protocol (IP) calls, Voice over Internet Protocol (VoIP) calls, IP Multimedia Subsystem (IMS) calls (e.g., Voice over LTE (VoLTE), Voice over New Radio (VoNR)) calls, and other types of calls that utilize IP-based attributes. In at least one implementation, the second call type is a higher bandwidth call type than the first call type, e.g., a 5G call type and a 4G call type, respectively.

At 1306 media data of the call event is received at the wireless device concurrently via the first call type via the first connection and the second call type via the second connection. The wireless device 102*a*, for example, receives a first stream of media signal over the first connection via the first call type and a second stream of media signal over the second connection via the second call type. The wireless module 106 converts the streams of media signal into media streams (e.g., packet streams, speech frame streams, and so forth) which are provided to the connectivity module 118 for generating media output for the call event.

In at least one implementation the media data received over the first and second call types is combined into a combined media data stream, such as by: At 1308 a first media stream of the call event is received via the first call type concurrently with a second media stream of the call event via the second call type. For instance, the connectivity module 118 receives separate media streams of media data from the wireless module 106. At 1310 at least some portions of the first media stream are combined with at least some portions of the second media stream to generate a combined media stream as part of the call event. Generally, media from the different media streams are combinable by the combiner module 902 in different ways. For instance, some individual packets and/or speech frames of the first media stream are merged with some individual packets and/or speech frames of the second media stream to generate merged packets and/or speech frames of the combined media stream. To merge packets and/or speech frames, for instance, the combiner module 902 identifies corresponding packets and/or speech frames between the different media streams, such as based on matching timestamp, matching sequence number from a respective media stream, and so forth. The combiner module 902 then merges the corresponding packets and/or speech frames by combining media data from the corresponding packets and/or speech frames into a single packet and/or speech frame of the combined media stream. The media data from the individual packets and/or speech frames, for instance, is compared and utilized for error correction to provide a more correct representation of media input that would be provided by an individual packet and/or speech frame of the original media streams.

As part of combining the media streams, the combiner module 902 can also discard individual packets and/or speech frames of a media stream, such as in response to determining that media data from a particular packet and/or speech frame is damaged and/or missing. For instance, the combiner module 902 identifies corresponding packets and/or speech frames between the different media streams and determines that one of the corresponding packets and/or speech frames includes media data/speech that is damaged and/or is missing. Accordingly, the combiner module 902 utilizes the other corresponding packet and/or speech frame for the combined media stream. Generally, combining packets and/or speech frames is executed in real time and correction can be applied to correct for latency introduced as part of the combination processing.

Figure 14:
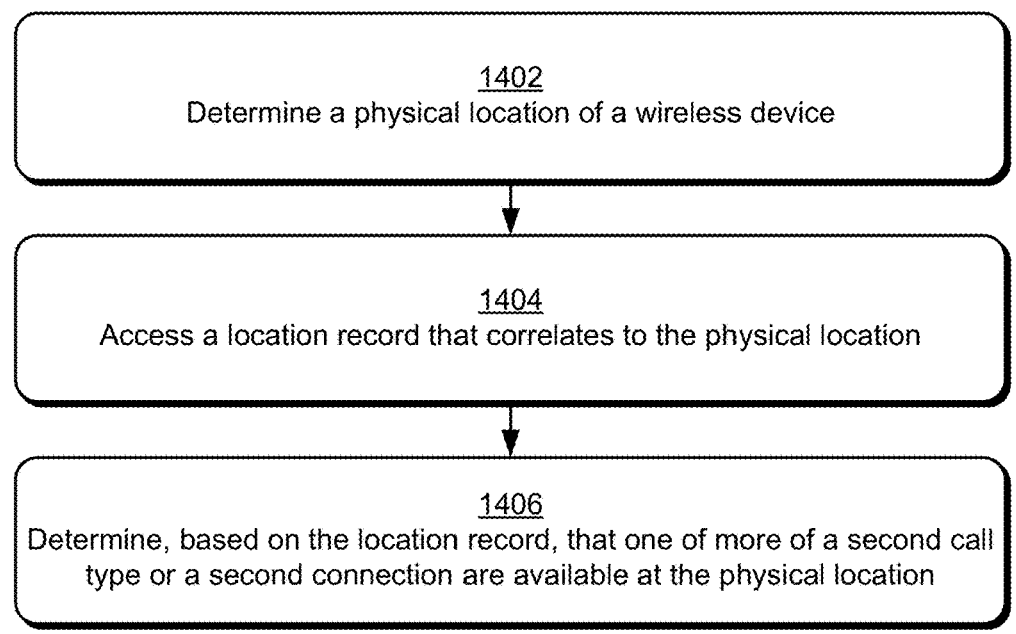
FIG. 14 is a flow diagram that depicts a method for identifying an available call type for a wireless call in accordance with one or more implementations.

FIG. 14 depicts a method 1400 for identifying an available call type for a wireless call in accordance with one or more implementations. The method 1400, for instance, is implemented in conjunction with step 1302 of the method 1300. At 1402 a physical location of a wireless device is determined. The connectivity module 118, for instance, queries the sensor system 108 for location information for a location of the wireless device 102a. Accordingly, the connectivity module 118 receives the location information, such as geographical coordinates, a place name, an address, etc.

At 1404 a location record is accessed that correlates to the physical location. For example, the connectivity module 118 searches the wireless event DB 120 and identifies a location record 500 that correlates to the physical location. Alternatively or additionally, the connectivity module 118 queries the connectivity service 124 with the location information, the connectivity service 124 then searches the service DB 126 for a location record 500 that corresponds to the location information and returns the location record to the wireless device 102a.

At 1406 it is determined, based on the location record, that one of more of that the second call type or the second connection are available at the physical location. The location record, for instance, identifies a second call type and/or second connection type that is available at the physical location. In at least one implementation, the location record identifies a default (e.g., primary) call type and a second (e.g., fallback) call type for the physical location. Accordingly, the connectivity module 118 can utilize the second call type and the second connection to establish a second connection for a call event in addition to a previously established connection.

Figure 15:
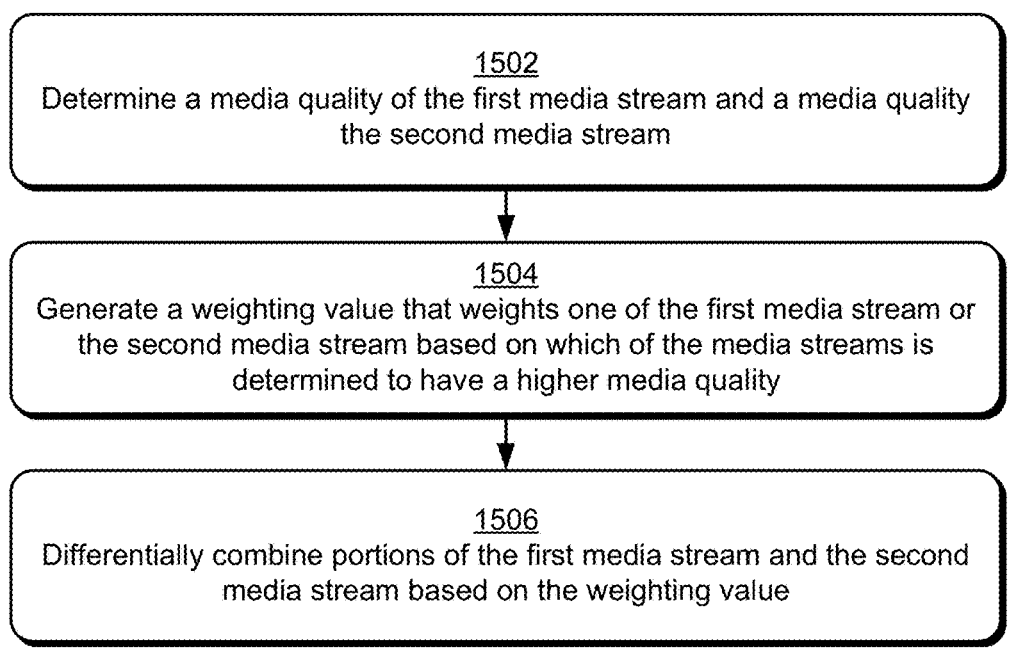
FIG. 15 is a flow diagram that depicts a method for differentially combining packets for a wireless call in accordance with one or more implementations.

FIG. 15 depicts a method 1500 for differentially combining media content for a wireless call in accordance with one or more implementations. The method 1500, for instance, describes an example way for performing step 1310 of the method 1300. At 1502 a media quality of the first media stream and a media quality the second media stream are determined. Media quality, for instance, can be determined by the connectivity module 118 in different ways, such as by inspecting individual packets for packet quality, missing data, missing packets from the packet stream, inspecting speech frames for media quality and/or media errors, missing speech frames, and so forth. Alternatively or additionally, the connectivity module 118 receives media quality information from the wireless module 106, such as based on error correction techniques (e.g., forward error correction (FEC)) applied by the wireless module 106 to incoming signal streams.

At 1504 a weighting value is generated that weights one of the first media stream or the second media stream based on which of the media streams is determined to have a higher media quality. The connectivity module 118, for instance, weights the media stream with the highest media quality (e.g., fewer packet and/or speech frame errors, fewer dropped packets and/or speech frames) higher than the other media stream.

At 1506 portions of the first media stream and the second media stream are differentially combined based on the weighting value. For instance, in a packet switched implementations, more packets from the media stream with the higher weighting value are used to generate a combined packet stream than are used from the other, lower weighted media stream. In a mixed packet switched/circuit switched scenario, more speech frames from the media stream with the higher weighting value are used to generate a combined media stream than are used from the other, lower weighted media stream. As one example, the combiner module 902 utilizes each packet and/or speech frame in a media sequence from the higher weighted media stream, but only utilizes every $p^{th}$ (e.g., where p=one of 10, 20, ... n) packet and/or speech frame from the other media stream.

In at least one implementation, the method 1500 is dynamically performed over a period of time, such as the duration of a call event that utilizes multiple call types and/or a duration of the call event that utilizes media combining. For instance, media stream quality is dynamically monitored (e.g., in real time) such that weighting values for media streams are dynamically generated and regenerated. Thus, differential combination of media streams is dynamically adjusted, such as when a higher weighting value switches back and forth between media streams.

Figure 16:
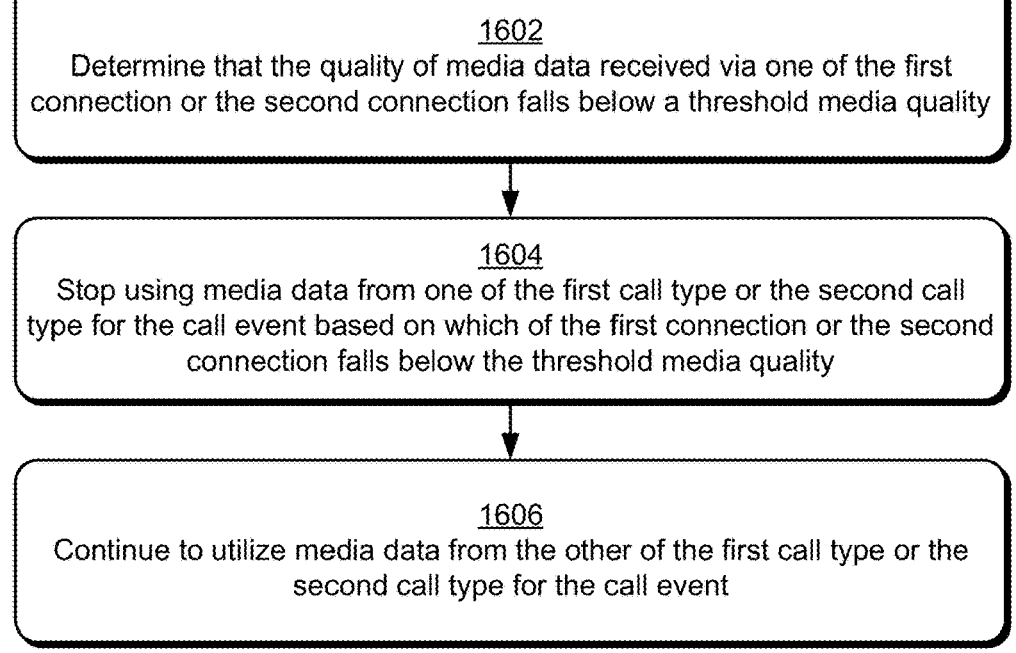
FIG. 16 is a flow diagram that depicts a method for determining whether to utilize data based on quality for a wireless call in accordance with one or more implementations.

FIG. 16 depicts a method 1600 for determining whether to utilize media data based on quality for a wireless call in accordance with one or more implementations. The method 1600, for instance, is implemented in conjunction with the methods 1300, 1500. At 1602 it is determined that the quality of media data received via one of the first connection or the second connection falls below a threshold media quality. The connectivity module 118, for example, monitors media quality of media data received via the first connection and the second connection as part of the call event. Example ways for monitoring media data quality (e.g., packet quality and/or speech quality) are discussed above, and may be performed by the connectivity module 118 and/or based on quality information received from the wireless module 106. Accordingly, the connectivity module 118 compares the quality information to a media quality threshold, such as defined with number of packet and/or speech frame errors, number of dropped packets and/or speech frames, MOS, and so forth. Further, based on the comparison, the connectivity module 118 determines that one of the first connection or the second connection falls below the threshold media quality.

At 1604 use of media data from one of the first call type or the second call type for the call event is stopped based on which of the first connection or the second connection falls below the threshold media quality. Media data from the call type, for instance, is not utilized for the call event, e.g., packets and/or speech frames from a respective media stream are not combined with media from the other media stream to generate a combined media stream. In at least one implementation, the connection for the call type is maintained, but media data received over the connection is not used. The connectivity module 118, for instance, notifies a network element 122 that provides the connection to maintain the connection but to stop sending media data. Alternatively the connectivity module 118 instructs the wireless module 106 to terminate the connection.

At 1606 media data from the other of the first call type or the second call type is continued to be used for the call event.

The connectivity module 118, for instance, continues to use media data from the other call type for the call event, i.e., the call type that did not fall below the media quality threshold.

Figure 17:
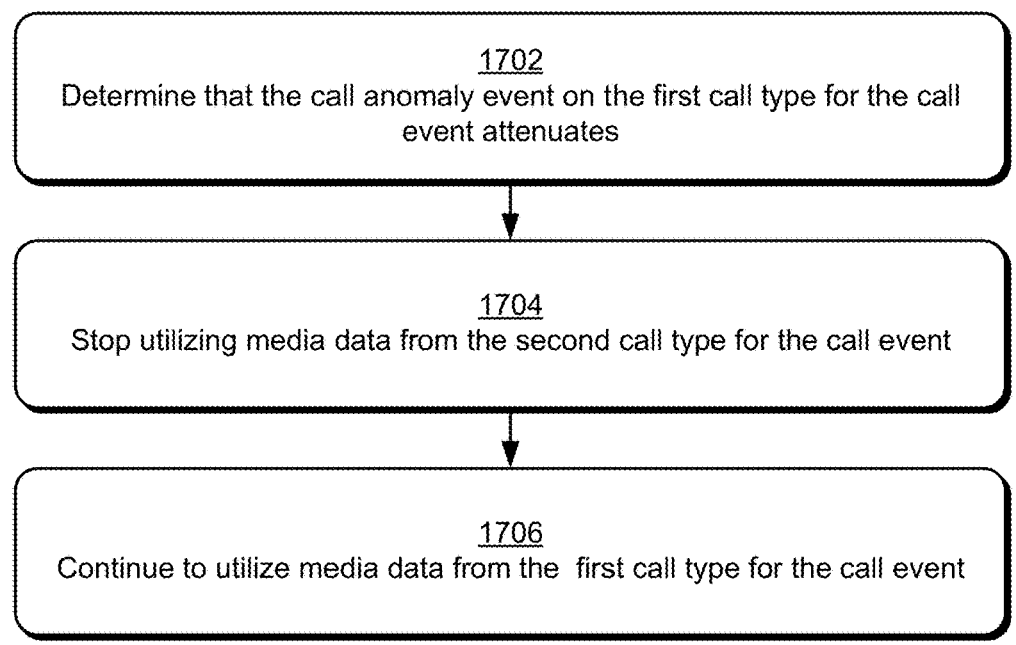
FIG. 17 is a flow diagram that depicts a method for determining to stop utilizing data of a particular call type for a wireless call in accordance with one or more implementations.

FIG. 17 depicts a method 1700 for determining to stop utilizing media data of a particular call type for a wireless call in accordance with one or more implementations. The method 1700, for instance, is implemented in conjunction with the methods described above. At 1702 it is determined that the call anomaly event on the first call type is mitigated. The connectivity module 118, for instance, determines the anomaly event detected for the first call type is mitigated and/or removed. In at least one implementation, this includes determining that call quality of media data received via the first call type exceeds a call quality threshold, such as defined in terms of packet stream quality, speech frame quality, MOS, and so forth.

At 1704 utilization of media data from the second call type for the call event is stopped. For example, in response to determining that the call anomaly of the first call type event is mitigated, the connectivity module 118 stops utilizing media data received via the second call type. In at least one implementation, the second connection for the second call type remains connected but media data received via the second call type over the second connection is not utilized. The combiner module 902, for instance, does not combine packets and/or speech frames of a media stream received via the second call type with media packets and/or speech frames of a media stream received via the first call type. As another example, the connectivity module 118 notifies a network element 122 that provides the second connection to maintain the connection but to stop sending media data. In at least one implementation, the connectivity module 118 instructs the wireless module 106 to disconnect the second call type, and the wireless module 106 terminates the second connection.

At 1706 media data from the first call type is continued to be used for the call event. The call event, for instance, remains active over the first call type and a media stream continues to be received over the first connection.

Accordingly, techniques for call type selection based on failure probability and multiple call types for a call event are applicable to increase call quality in different scenarios and environments, such as in situations where a primary call connection experiences an anomaly condition that causes quality call degradation.

The example methods described above may be performed in various ways, such as for implementing different aspects of the systems and scenarios described herein. Generally, any services, components, modules, methods, and/or operations described herein can be implemented using software, firmware, hardware (e.g., fixed logic circuitry), manual processing, or any combination thereof. Some operations of the example methods may be described in the general context of executable instructions stored on computer-readable storage memory that is local and/or remote to a computer processing system, and implementations can include software applications, programs, functions, and the like. Alternatively or in addition, any of the functionality described herein can be performed, at least in part, by one or more hardware logic components, such as, and without limitation, Field-programmable Gate Arrays (FPGAs), Application-specific Integrated Circuits (ASICs), Application-specific Standard Products (ASSPs), System-on-a-chip systems (SoCs), Complex Programmable Logic Devices (CPLDs), and the like. The order in which the methods are described is not intended to be construed as a limitation, and any number or combination of the described method operations can be performed in any order to perform a method, or an alternate method.

Figure 18:
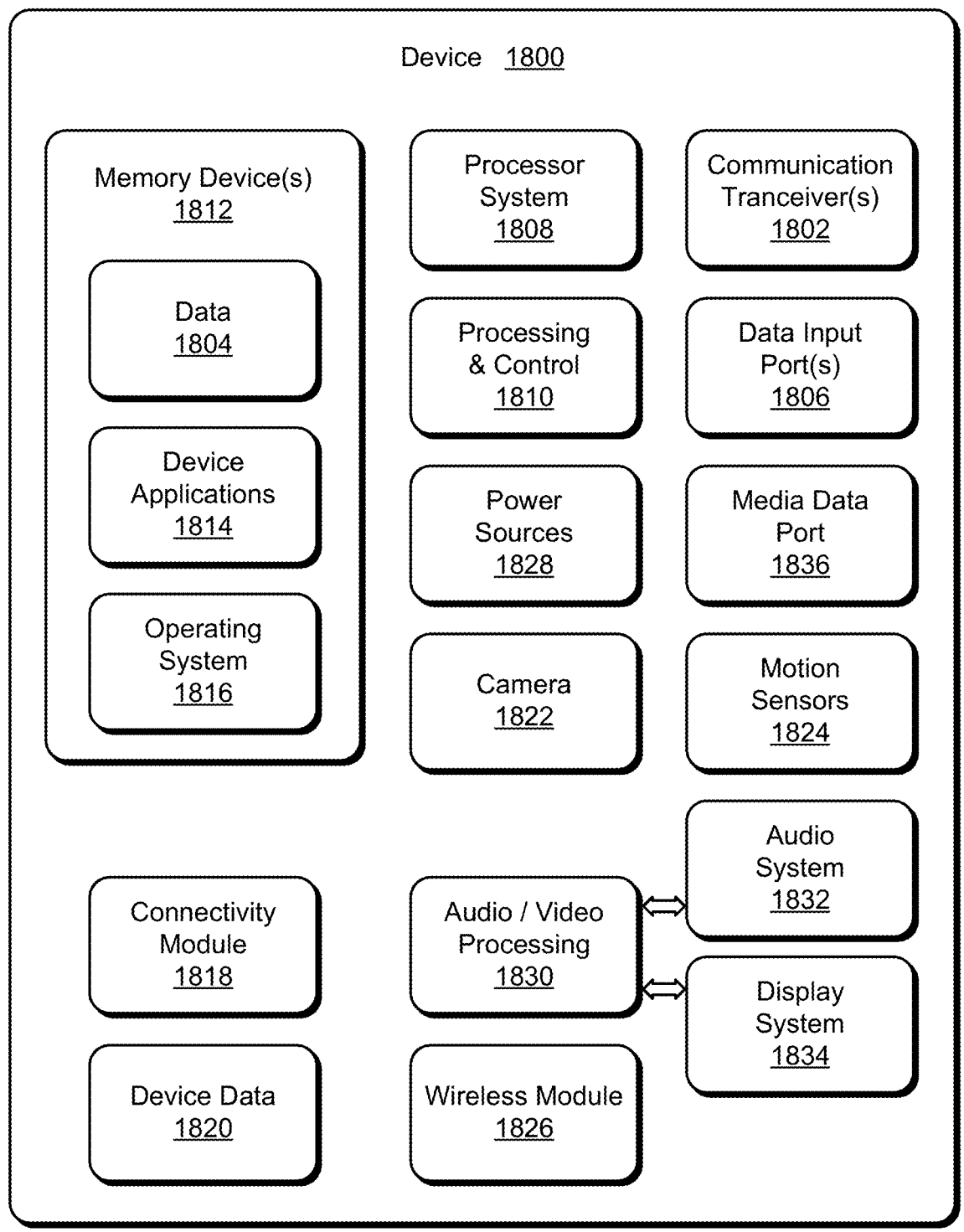
FIG. 18 illustrates various components of an example device that can implement aspects of call type selection based on failure probability and multiple call types for a call event.

FIG. 18 illustrates various components of an example device 1800 in which aspects of call type selection based on failure probability can be implemented. The example device 1800 can be implemented as any of the devices described with reference to the previous FIGS. 1-17, such as any type of wireless device, mobile phone, mobile device, wearable device, tablet, computing, communication, entertainment, gaming, media playback, and/or other type of electronic device. For example, the wireless devices 102 as shown and described with reference to FIGS. 1-17 may be implemented as the example device 1800.

The device 1800 includes communication transceivers 1802 that enable wired and/or wireless communication of data 1804 with other devices. The data 1804 can include any of device identifying data, device location data, wireless connectivity data, and wireless protocol data. Additionally, the data 1804 can include any type of audio, video, and/or image data. Example communication transceivers 1802 include wireless personal area network (WPAN) radios compliant with various IEEE 1802.15 (Bluetooth™) standards, wireless local area network (WLAN) radios compliant with any of the various IEEE 1802.11 (Wi-Fi™) standards, wireless wide area network (WWAN) radios for cellular phone communication, wireless metropolitan area network (WMAN) radios compliant with various IEEE 1802.16 (WiMAX™) standards, and wired local area network (LAN) Ethernet transceivers for network data communication.

The device 1800 may also include one or more data input ports 1806 via which any type of data, media content, and/or inputs can be received, such as user-selectable inputs to the device, messages, music, television content, recorded content, and any other type of audio, video, and/or image data received from any content and/or data source. The data input ports may include USB ports, coaxial cable ports, and other serial or parallel connectors (including internal connectors) for flash memory, DVDs, CDs, and the like. These data input ports may be used to couple the device to any type of components, peripherals, or accessories such as microphones and/or cameras.

The device 1800 includes a processor system 1808 of one or more processors (e.g., any of microprocessors, controllers, and the like) and/or a processor and memory system implemented as a system-on-chip (SoC) that processes computer-executable instructions. The processor system may be implemented at least partially in hardware, which can include components of an integrated circuit or on-chip system, an application-specific integrated circuit (ASIC), a field-programmable gate array (FPGA), a complex programmable logic device (CPLD), and other implementations in silicon and/or other hardware. Alternatively or in addition, the device can be implemented with any one or combination of software, hardware, firmware, or fixed logic circuitry that is implemented in connection with processing and control circuits, which are generally identified at 1810. The device 1800 may further include any type of a system bus or other data and command transfer system that couples the various components within the device. A system bus can include any one or combination of different bus structures and architectures, as well as control and data lines.

The device 1800 also includes computer-readable storage memory 1812 (e.g., memory devices) that enable data storage, such as data storage devices that can be accessed by a computing device, and that provide persistent storage of data and executable instructions (e.g., software applications, programs, functions, and the like). Examples of the computer-readable storage memory 1812 include volatile memory and non-volatile memory, fixed and removable media devices, and any suitable memory device or electronic data storage that maintains data for computing device access. The computer-readable storage memory can include various implementations of random access memory (RAM), read-only memory (ROM), flash memory, and other types of storage media in various memory device configurations. The device 1800 may also include a mass storage media device.

The computer-readable storage memory 1812 provides data storage mechanisms to store the data 1804, other types of information and/or data, and various device applications 1814 (e.g., software applications). For example, an operating system 1816 can be maintained as software instructions with a memory device and executed by the processing system 1808. The device applications may also include a device manager, such as any form of a control application, software application, signal-processing and control module, code that is native to a particular device, a hardware abstraction layer for a particular device, and so on. Computer-readable storage memory 1812 represents media and/or devices that enable persistent and/or non-transitory storage of information in contrast to mere signal transmission, carrier waves, or signals per se. Computer-readable storage memory 1812 do not include signals per se or transitory signals.

In this example, the device 1800 includes a connectivity module 1818 that implements aspects of call type selection based on failure probability, and may be implemented with hardware components and/or in software as one of the device applications 1814, such as when the device 1800 is implemented as a wireless device 102. An example, the connectivity module 1818 can be implemented as the connectivity module 118 described in detail above. In implementations, the connectivity module 1818 may include independent processing, memory, and logic components as a computing and/or electronic device integrated with the device 1800. The device 1800 also includes device data 1820 for implementing aspects of call type selection based on failure probability and may include data from the connectivity module 118.

In this example, the example device 1800 also includes a camera 1822 and motion sensors 1824, such as may be implemented in an inertial measurement unit (IMU). The motion sensors 1824 can be implemented with various sensors, such as a gyroscope, an accelerometer, and/or other types of motion sensors to sense motion of the device. The various motion sensors 1824 may also be implemented as components of an inertial measurement unit in the device.

The device 1800 also includes a wireless module 1826, which is representative of functionality to perform various wireless communication tasks. For instance, for a wireless device 102, the wireless module 1826 can be leveraged to scan for and detect wireless networks, as well as negotiate wireless connectivity to wireless networks for a wireless device 102. The device 1800 can also include one or more power sources 1828, such as when the device is implemented as a wireless device. The power sources 1828 may include a charging and/or power system, and can be implemented as a flexible strip battery, a rechargeable battery, a charged super-capacitor, and/or any other type of active or passive power source. Generally, utilizing implementations of call type selection based on failure probability enables the power sources 1828 to be conserved as part of a wireless network connectivity process.

The device 1800 also includes an audio and/or video processing system 1830 that generates audio data for an audio system 1832 and/or generates display data for a display system 1834. The audio system and/or the display system may include any devices that process, display, and/or otherwise render audio, video, display, and/or image data. Display data and audio signals can be communicated to an audio component and/or to a display component via an RF (radio frequency) link, S-video link, HDMI (high-definition multimedia interface), composite video link, component video link, DVI (digital video interface), analog audio connection, or other similar communication link, such as media data port 1836. In implementations, the audio system and/or the display system are integrated components of the example device. Alternatively, the audio system and/or the display system are external, peripheral components to the example device.

Although implementations of call type selection based on failure probability have been described in language specific to features and/or methods, the subject of the appended claims is not necessarily limited to the specific features or methods described. Rather, the features and methods are disclosed as example implementations of call type selection based on failure probability, and other equivalent features and methods are intended to be within the scope of the appended claims. Further, various different examples are described, and it is to be appreciated that each described example can be implemented independently or in connection with one or more other described examples. Additional aspects of the techniques, features, and/or methods discussed herein relate to one or more of the following:

A wireless device comprising: a wireless module including components to initiate and receive wireless calls; and a connectivity module implemented to: determine that a call is to be initiated at a physical location of the wireless device; access a location record for the physical location, the location record identifying a probability that a call failure will occur using a first call type at the physical location; identify, in response to the probability exceeding a threshold probability, a second successful call type available at the physical location; and cause the wireless module to initiate the call via the second call type.

Alternatively or in addition to the above described wireless device, any one or combination of: wherein the location record is stored locally on the wireless device; wherein to access the location record comprises a query from the wireless device to a network service for the location record; wherein the first call type comprises a first radio access technology, and the second call type comprises a second, different radio access technology; wherein the first call type comprises a packet switched call type, and the second call type comprises a circuit switched call type; wherein the connectivity module is further implemented to: receive an indication that a subsequent call is to be initiated at the physical location of the wireless device; determine that a trigger event occurs indicating that the subsequent call is to be initiated via the first call type; and cause a call attempt for the subsequent call to be initiated via the first call type; wherein the trigger event comprises one or more of an expiration of a timer for the location record, a call count threshold at the physical location, or an indication of a change in a wireless network attribute at the physical location; wherein the connectivity module is further implemented to update the location record based on a result of the call attempt for the subsequent call.

A method comprising: receiving an indication that a call event on a wireless device initiated via a first call type experiences a failure event and that a remedial process is executed to restore the call event via a second call type; determining a location of the wireless device; generating a location record that identifies the location and indicates that the second call type is to be used for initiating a subsequent call event at the location; and causing the location record to be available for enabling the subsequent call to be initiated utilizing the location record.

Alternatively or in addition to the above described method, any one or combination of: wherein: the first call type comprises a packet switched call implemented via a first radio access technology, and the second call type comprises a circuit switched call implemented via a second radio access technology; or the first call type comprises a packet switched call implemented via a first radio access technology and the second call type comprises a packet switched call implemented via a second radio access technology; further comprising: calculating a first probability score based on the failure event, the probability score indicating a probability that a future call failure will occur at the location using the first call type; calculating a second probability score that indicates a probability of call success using the second call type, the second probability score being based at least on the call type for the second call type, a radio access technology for the second call type, the location of the wireless device, and time of day; and generating the location record to include the first probability score and the second probability score for the location; wherein said calculating the probability score is based on a number of call failures that occur at the location and a total number of call attempts at the location; further comprising: receiving an indication that a further subsequent call is to be initiated at the physical location of the wireless device; determining that a trigger event occurs indicating that the further subsequent call is to be initiated via the first call type; and causing a call attempt for the further subsequent call to be initiated via the first call type; wherein the trigger event comprises one or more of an expiration of a timer for the location record, a call count threshold at the physical location, or an indication of a change in a wireless network attribute at the physical location; further comprising updating the location record based on a result of the call attempt for the further subsequent call; further comprising receiving an indication that the call attempt for the further subsequent call is successful utilizing the first call type, and wherein said updating the location record based on a result of the call attempt for the further subsequent call comprising updating a probability score for the physical location to indicate that the first call type is to be used for initiating a call at the physical location; further comprising: storing the location record at a network-based service; and communicating the location record from the network-based service to the wireless device in response to an indicating that the subsequent call is to be initiated at the location of the wireless device.

A method comprising: determining that a call is to be initiated at a physical location of a wireless device; accessing a location record for the physical location, the location record identifying a probability that a call failure will occur using a first call type at the physical location; identifying, in response to the probability exceeding a threshold probability, a second call type available at the physical location; and causing the wireless device to initiate the call via the second call type.

Alternatively or in addition to the above described method, any one or combination of: wherein the first call type represents a default call type at the physical location utilizing a first radio access technology, and the second call type utilizes a second, different radio access technology; further comprising: receiving an indication of a call failure for a call using the first call type at the physical location; and updating the location record by updating the probability that a call failure will occur using the first call type at the physical location.

The invention claimed is:

1. A wireless device comprising:
a wireless module including components to initiate and receive wireless calls; and
a connectivity module implemented to:
determine that a call is to be initiated at a physical location of the wireless device;
access a location record for the physical location, the location record identifying a probability that a call failure will occur using a first call type at the physical location;
identify, in response to the probability exceeding a threshold probability, a second successful call type available at the physical location; and
cause the wireless module to initiate the call via the second call type.

2. The wireless device as recited in claim 1, wherein the location record is stored locally on the wireless device.

3. The wireless device as recited in claim 1, wherein to access the location record comprises a query from the wireless device to a network service for the location record.

4. The wireless device as recited in claim 1, wherein the first call type comprises a first radio access technology, and the second call type comprises a second, different radio access technology.

5. The wireless device as recited in claim 1, wherein the first call type comprises a packet switched call type, and the second call type comprises a circuit switched call type.

6. The wireless device as recited in claim 1, wherein the connectivity module is further implemented to:
receive an indication that a subsequent call is to be initiated at the physical location of the wireless device;
determine that a trigger event occurs indicating that the subsequent call is to be initiated via the first call type; and
cause a call attempt for the subsequent call to be initiated via the first call type.

7. The wireless device as recited in claim 6, wherein the trigger event comprises one or more of an expiration of a timer for the location record, a call count threshold at the physical location, or an indication of a change in a wireless network attribute at the physical location.

8. The wireless device as recited in claim 6, wherein the connectivity module is further implemented to update the location record based on a result of the call attempt for the subsequent call.

9. A method comprising:
receiving an indication that a call event on a wireless device initiated via a first call type experiences a failure event and that a remedial process is executed to restore the call event via a second call type;
determining a location of the wireless device;
generating a location record that identifies the location and indicates that the second call type is to be used for initiating a subsequent call event at the location; and
causing the location record to be available for enabling the subsequent call to be initiated utilizing the location record.

10. The method as recited in claim 9, wherein:
the first call type comprises a packet switched call implemented via a first radio access technology, and the second call type comprises a circuit switched call implemented via a second radio access technology; or the first call type comprises a packet switched call implemented via a first radio access technology and the second call type comprises a packet switched call implemented via a second radio access technology.

11. The method as recited in claim 9, further comprising:

calculating a first probability score based on the failure event, the probability score indicating a probability that a future call failure will occur at the location using the first call type;

calculating a second probability score that indicates a probability of call success using the second call type, the second probability score being based at least on the call type for the second call type, a radio access technology for the second call type, the location of the wireless device, and time of day; and generating the location record to include the first probability score and the second probability score for the location.

12. The method as recited in claim 11, wherein said calculating the probability score is based on a number of call failures that occur at the location and a total number of call attempts at the location.

13. The method as recited in claim 9, further comprising:

receiving an indication that a further subsequent call is to be initiated at the physical location of the wireless device;

determining that a trigger event occurs indicating that the further subsequent call is to be initiated via the first call type; and causing a call attempt for the further subsequent call to be initiated via the first call type.

14. The method as recited in claim 13, wherein the trigger event comprises one or more of an expiration of a timer for the location record, a call count threshold at the physical location, or an indication of a change in a wireless network attribute at the physical location.

15. The method as recited in claim 13, further comprising updating the location record based on a result of the call attempt for the further subsequent call.

16. The method as recited in claim 15, further comprising receiving an indication that the call attempt for the further subsequent call is successful utilizing the first call type, and wherein said updating the location record based on a result of the call attempt for the further subsequent call comprising updating a probability score for the physical location to indicate that the first call type is to be used for initiating a call at the physical location.

17. The method as recited in claim 9, further comprising:

storing the location record at a network-based service; and communicating the location record from the network-based service to the wireless device in response to an indicating that the subsequent call is to be initiated at the location of the wireless device.

18. A method comprising:

determining that a call is to be initiated at a physical location of a wireless device;

accessing a location record for the physical location, the location record identifying a probability that a call failure will occur using a first call type at the physical location;

identifying, in response to the probability exceeding a threshold probability, a second call type available at the physical location; and causing the wireless device to initiate the call via the second call type.

19. The method as recited in claim 18, wherein the first call type represents a default call type at the physical location utilizing a first radio access technology, and the second call type utilizes a second, different radio access technology.

20. The method as recited in claim 18, further comprising:

receiving an indication of a call failure for a call using the first call type at the physical location; and updating the location record by updating the probability that a call failure will occur using the first call type at the physical location.

* * * * *